US012734833B2

(12) United States Patent
Ueno et al.

(10) Patent No.: US 12,734,833 B2
(45) Date of Patent: Sep. 15, 2026

(54) RECORDING DEVICE

(71) Applicant: SEIKO EPSON CORPORATION, Tokyo (JP)

(72) Inventors: Kohei Ueno, Matsumoto (JP); Kazuhisa Kawakami, Matsumoto (JP); Kazuyoshi Ohashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 18/412,553

(22) Filed: Jan. 14, 2024

(65) Prior Publication Data

US 2024/0239120 A1 Jul. 18, 2024

(30) Foreign Application Priority Data

Jan. 17, 2023 (JP) ................................ 2023-005113

(51) Int. Cl.

*B41J 13/08* (2006.01)
*B41J 11/00* (2006.01)
*B41J 13/02* (2006.01)
*B65H 43/04* (2006.01)

(52) U.S. Cl.

CPC ............ *B41J 11/006* (2013.01); *B41J 11/007* (2013.01); *B41J 11/0095* (2013.01); *B41J 13/025* (2013.01); *B41J 13/08* (2013.01); *B65H 43/04* (2013.01); *B65H 2406/10* (2013.01); *B65H 2601/11* (2013.01)

(58) Field of Classification Search

CPC ........ B41J 13/08; B41J 11/006; B41J 11/007; B41J 11/0095; B65H 43/04; B65H 2406/10; B65H 2601/10; B65H 2601/11

See application file for complete search history.

(56) References Cited

U.S. PATENT DOCUMENTS

2009/0189966 A1* 7/2009 Sugimoto ............ B41J 13/0045 347/104
2009/0189967 A1 7/2009 Sakano
2014/0253623 A1* 9/2014 Nakano ................ B41J 11/0045 347/16

FOREIGN PATENT DOCUMENTS

CN 101497280 8/2009
JP H11-174856 A 7/1997
JP 2020001851 A * 1/2020

* cited by examiner

*Primary Examiner* — Douglas X Rodriguez
*Assistant Examiner* — Kendrick X Liu
(74) *Attorney, Agent, or Firm* — WORKMAN NYDEGGER

(57) ABSTRACT

A recording device includes a conveyance belt that adsorbs and conveys a medium using charge, a recording unit that performs recording on the medium conveyed by the conveyance belt, a determination unit that determines whether or not the medium is jammed, and a peeling unit that peels off the medium from the conveyance belt by blowing air. When there is a medium staying on the conveyance belt at the time of occurrence of the jam, the peeling unit peels off the medium from the conveyance belt by blowing air toward an acute angled gap in a state in which the acute angled gap is formed between the conveyance belt and the medium.

5 Claims, 26 Drawing Sheets

RECORDING DEVICE

The present application is based on, and claims priority from JP Application Serial Number 2023-005113, filed Jan. 17, 2023, the disclosure of which is hereby incorporated by reference herein in its entirety.

BACKGROUND

1. Technical Field

The present disclosure relates to a recording device including a conveyance belt that conveys a medium.

2. Related Art

For example, JP-A-11-174856 discloses an image forming device (an example of a recording device) including a conveyance belt (for example, a transfer belt) that conveys a medium such as paper that is a recording target, and a peeling unit that peels off the medium from the conveyance belt. The medium is conveyed while being adsorbed to the transfer belt by an electrostatic adsorption force.

Even when power is turned off at the time of occurrence of a medium jam, the medium is adsorbed to the conveyance belt due to an electrostatic force generated by residual charge staying on the conveyance belt. Therefore, there is no raised portion or gap for pinching the medium, making it difficult to perform removal work for removing the medium. The peeling unit includes a claw-like member supported to be rotatable around an axis that is substantially parallel to a belt member surface and substantially perpendicular to a conveyance direction of the medium. A leading end of the claw-like member moves while substantially rubbing against a surface of the belt member, thereby peeling off a sheet from the belt member. Therefore, a user can easily pinch the medium, and work of removing the medium becomes easy.

However, there is a problem in that the conveyance belt is likely to be damaged by the claw-like member when the medium is peeled off from the conveyance belt by the claw-like member. Therefore, there is a need for a recording device that can peel off the medium from the conveyance belt while curbing damage to the conveyance belt.

SUMMARY

A recording device that solves the above problem includes a conveyance belt configured to adsorb and convey a medium using charge; a recording unit configured to perform recording on the medium conveyed by the conveyance belt; a determination unit configured to determine whether or not the medium is jammed; and a peeling unit configured to peel off the medium from the conveyance belt by blowing air, wherein, when there is a medium staying on the conveyance belt at the time of occurrence of the jam, the peeling unit peels off the medium from the conveyance belt by blowing air, in a state in which an acute angled gap is formed between the conveyance belt and the medium, toward the acute angled gap.

A recording device that solves the above problem includes: a conveyance belt configured to adsorb and convey a medium using charge; a recording unit configured to perform recording on the medium conveyed by the conveyance belt; a determination unit configured to determine whether or not the medium is jammed; and a peeling unit configured to peel off the medium from the conveyance belt using a peeling member, wherein, when there is a medium staying on the conveyance belt at the time of occurrence of the jam, the peeling unit peels off the medium from the conveyance belt by inserting the peeling member, in a state in which an acute angled gap is formed between the conveyance belt and the medium, into the acute angled gap.

A recording device that solves the above problem includes: a conveyance belt configured to adsorb and convey a medium using charge; a recording unit configured to perform recording on the medium conveyed by the conveyance belt; a determination unit configured to determine whether or not the medium is jammed; a moving mechanism configured to set one end portion of the conveyance belt as a fixed end, and move a free end that is the other end of the conveyance belt downward; and a roller pair provided downstream of the free end of the conveyance belt in a conveyance direction of the medium and configured to nip the medium; wherein, when the roller pair is nipping the medium at the time of occurrence of the jam, the moving mechanism moves the conveyance belt downward, and when the roller pair is not nipping the medium, the conveyance belt conveys the medium to a position at which the roller pair is nippable, and the moving mechanism moves the free end of the conveyance belt downward.

DESCRIPTION OF EMBODIMENTS

Figure 1:
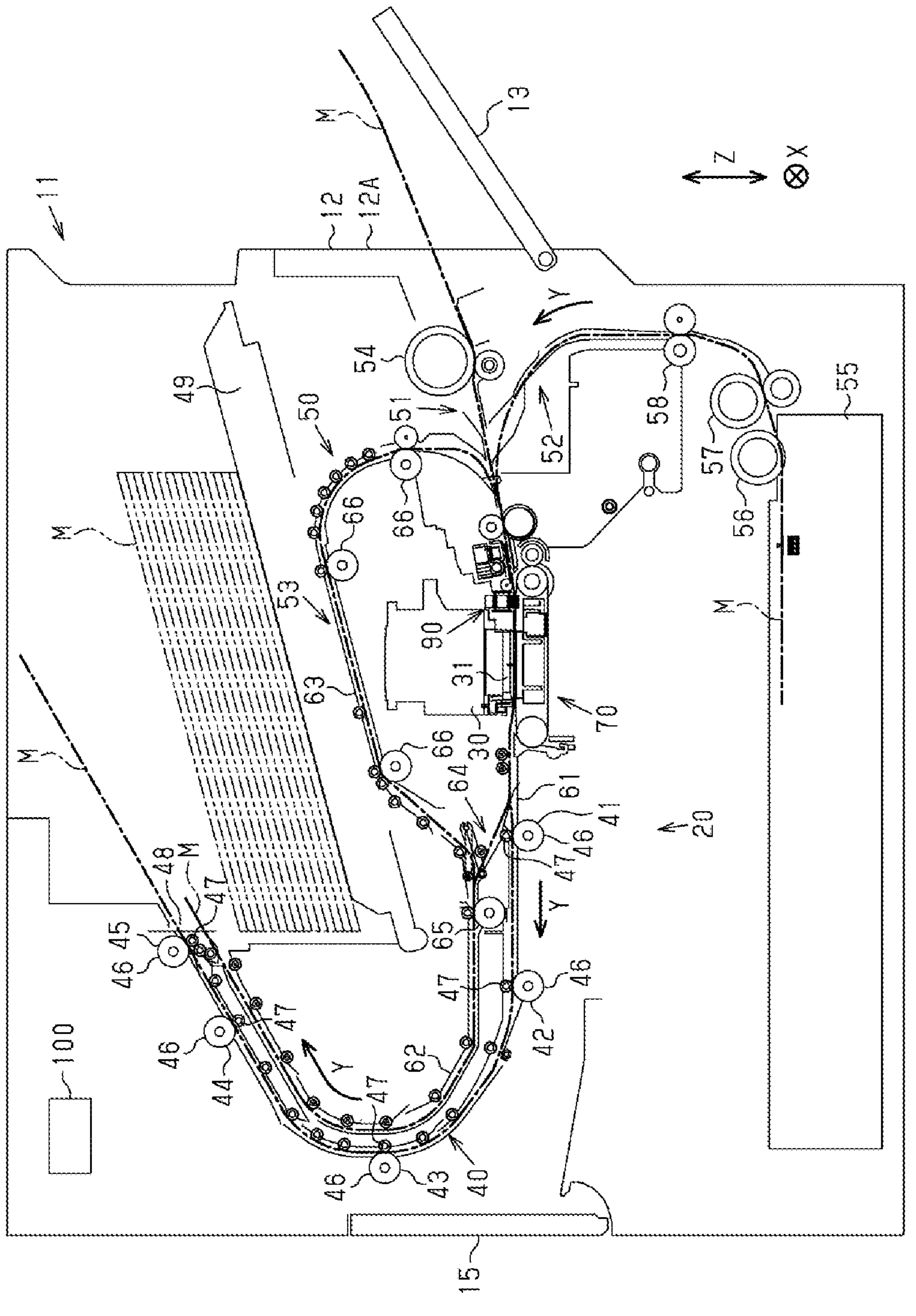
FIG. 1 is a schematic front sectional view illustrating a recording device in a first embodiment.

Hereinafter, an embodiment of a recording device will be described with reference to the drawings. The recording device of the present embodiment is an inkjet printer that records characters or images by ejecting ink onto a medium such as paper. In FIG. 1, it is assumed that the recording device 11 is placed on a horizontal plane.

As illustrated in FIG. 1, a conveyance unit 20 that conveys a medium M along a conveyance path, and a recording unit 30 that performs recording on the medium M that is being conveyed are provided inside a housing 12 of the recording device 11 of the present embodiment. In FIG. 1, when a direction perpendicular to a paper surface is set as a width direction X of the medium M, the conveyance path is formed to convey the medium M in a direction intersecting (orthogonal to) the width direction X of the medium M.

In the following description, a direction in which the medium M is conveyed will be referred to as a “conveyance direction Y,” and a vertical direction will be referred to as a “vertical direction Z.” Here, the conveyance direction Y is a direction intersecting with (for example, orthogonal to) the width direction X. In other words, the width direction X is a direction intersecting with (for example, orthogonal to) the conveyance direction Y. A vertical direction Z is a direction intersecting with (for example, orthogonal to) the width direction X and the conveyance direction Y. Further, a direction opposite to the conveyance direction Y is also referred to as upstream in the conveyance direction, and the conveyance direction Y is also referred to as downstream in the conveyance direction.

The recording unit 30 includes a line head type recording head 31 that can simultaneously eject ink, which is an example of a coloring material, over substantially the entire region of the medium M in the width direction X. The ink ejected from nozzles 32 (see FIG. 2) formed in this recording head 31 adheres to the medium M, so that recording is performed on a recording surface Mb of the medium M. Incidentally, in the recording head 31 capable of ejecting ink of a plurality of colors, a nozzle array including a plurality of nozzles 32 that eject ink with the same color is formed in the width direction X, and a nozzle array that ejects different color ink is formed to be arranged in the conveyance direction Y.

The conveyance unit 20 includes a feeding mechanism unit 50 that feeds the unrecorded medium M along the conveyance path, and a discharge mechanism unit 40 that discharges the recorded medium M to the outside of the housing 12. Here, the feeding mechanism unit 50 is provided upstream in the conveyance direction, and the discharge mechanism unit 40 is provided downstream in the conveyance direction.

The feeding mechanism unit 50 includes a first medium supply unit 51, a second medium supply unit 52, a third medium supply unit 53, and an electrostatic conveyance unit 70. The first medium supply unit 51, the second medium supply unit 52, and the third medium supply unit 53 convey the medium M toward the electrostatic conveyance unit 70, and the electrostatic conveyance unit 70 conveys the medium M toward the discharge mechanism unit 40.

An openable and closable feeding tray 13 is provided on one side (the right side in FIG. 1) of the housing 12, and when the feeding tray 13 is opened, an insertion port 12A is exposed. The first medium supply unit 51 includes a first feeding roller 54 that clamps the medium M inserted into the housing 12 from the insertion port 12A. The medium M is transported toward the electrostatic conveyance unit 70 due to the rotation of the first feeding roller 54.

Further, a feeding cassette 55 in which the medium M before recording is set in a stacked state is provided at the bottom of the housing 12. The second medium supply unit 52 is a supply unit for feeding the medium M from the feeding cassette 55. That is, the second medium supply unit 52 includes a pickup roller 56 that sends the uppermost medium M in the feeding cassette 55 to the outside of the feeding cassette 55, and a peeling roller 57 that curbs the plurality of mediums M being conveyed in an overlapped manner, and a second feeding roller 58 that clamps one sheet of the medium M that has passed through the peeling roller 57. The medium M is conveyed toward the electrostatic conveyance unit 70 through the rotation of the pickup roller 56, the peeling roller 57, and the second feeding roller 58.

The third medium supply unit 53 is a supply unit for guiding the medium M of which one side has already been recorded on, to the electrostatic conveyance unit 70 again when double-sided recording in which recording is performed on both sides of the medium M is performed. The third medium supply unit 53 includes a branching mechanism 64 that switches the conveyance path of the medium M to a first conveyance path 61 leading to a discharge port 48 or a second conveyance path 62 branching from the first conveyance path 61 downstream of the electrostatic conveyance unit 70 in the conveyance direction. Further, in the third medium supply unit 53, a branch conveyance roller 65 is provided on the second conveyance path 62, and a plurality of reversing conveyance rollers 66 are provided in the third conveyance path 63 branching from the second conveyance path 62.

When double-sided recording is performed, the medium M of which one side has been recorded on is guided from the electrostatic conveyance unit 70 to the second conveyance path 62 by the branching mechanism 64. In this case, the medium M is conveyed downstream in the conveyance direction through the rotation of the branch conveyance roller 65 in a forward direction. When a trailing end of the medium M is guided to the second conveyance path 62, the branch conveyance roller 65 is rotated in an opposite direction, and the medium M is conveyed in the opposite direction. Then, the medium M is guided to the third conveyance path 63 located above the recording unit 30 in FIG. 1, and the medium M is conveyed along the third conveyance path 63 through rotation of the plurality of reversing conveyance rollers 66. Accordingly, the medium M is joined to the first conveyance path 61 upstream of the electrostatic conveyance unit 70 in the conveyance direction, and the medium M is guided to the electrostatic conveyance unit 70 again.

When the medium M is guided to the electrostatic conveyance unit 70 again in this manner, the recorded side comes into contact with the electrostatic conveyance unit 70, and the unrecorded side faces the recording head 31. In the following description, among both surfaces of the medium M, a surface that comes into contact with the electrostatic conveyance unit 70 is also referred to as a "back surface Ma," and a surface opposite to the back surface Ma is also referred to as the "recording surface Mb."

The discharge mechanism unit 40 includes a plurality of roller pairs 41, 42, 43, 44, and 45 disposed along the conveyance path. The roller pairs 41 to 45 each include a drive roller 46 that applies a conveyance force to the medium M by being rotationally driven, and a driven roller 47 that is driven to rotate as the medium M is conveyed. The drive roller 46 and the driven roller 47 have the width direction X as a rotation axis direction, and the driven roller 47 is biased toward the drive roller 46. Further, a cross-sectional shape of the drive roller 46 intersecting with the width direction X is circular, and the cross-sectional shape of the driven roller 47 intersecting with the width direction X is approximately star-shaped. That is, since the driven roller 47 is a roller that comes into contact with the side of the medium M on which recording is performed, the driven roller 47 is configured to have a contact area with the side as small as possible.

The medium M conveyed by the discharge mechanism unit 40 is discharged from the discharge port 48 formed in the housing 12 to the outside the housing 12. That is, this discharge port 48 is a downstream end of the conveyance path, that is, furthest downstream in the conveyance path. The medium M discharged from the discharge port 48 is placed in a stacked state on a placement table 49, as indicated by a two-dot dashed line in FIG. 1.

Further, as illustrated in FIG. 1, a cover 15 that can be opened and closed is provided on the other side (the left side in FIG. 1) of the housing 12. When a jam in which the medium M is jammed in the middle of the conveyance path occurs in the housing 12, the user can perform jam removal work of removing the jammed medium M from the inside of the housing 12 exposed by opening the cover 15.

Further, the control unit 100 is disposed at a predetermined position within the housing 12. The control unit 100 controls the conveyance unit 20, the recording unit 30, and the like.

Figure 2:
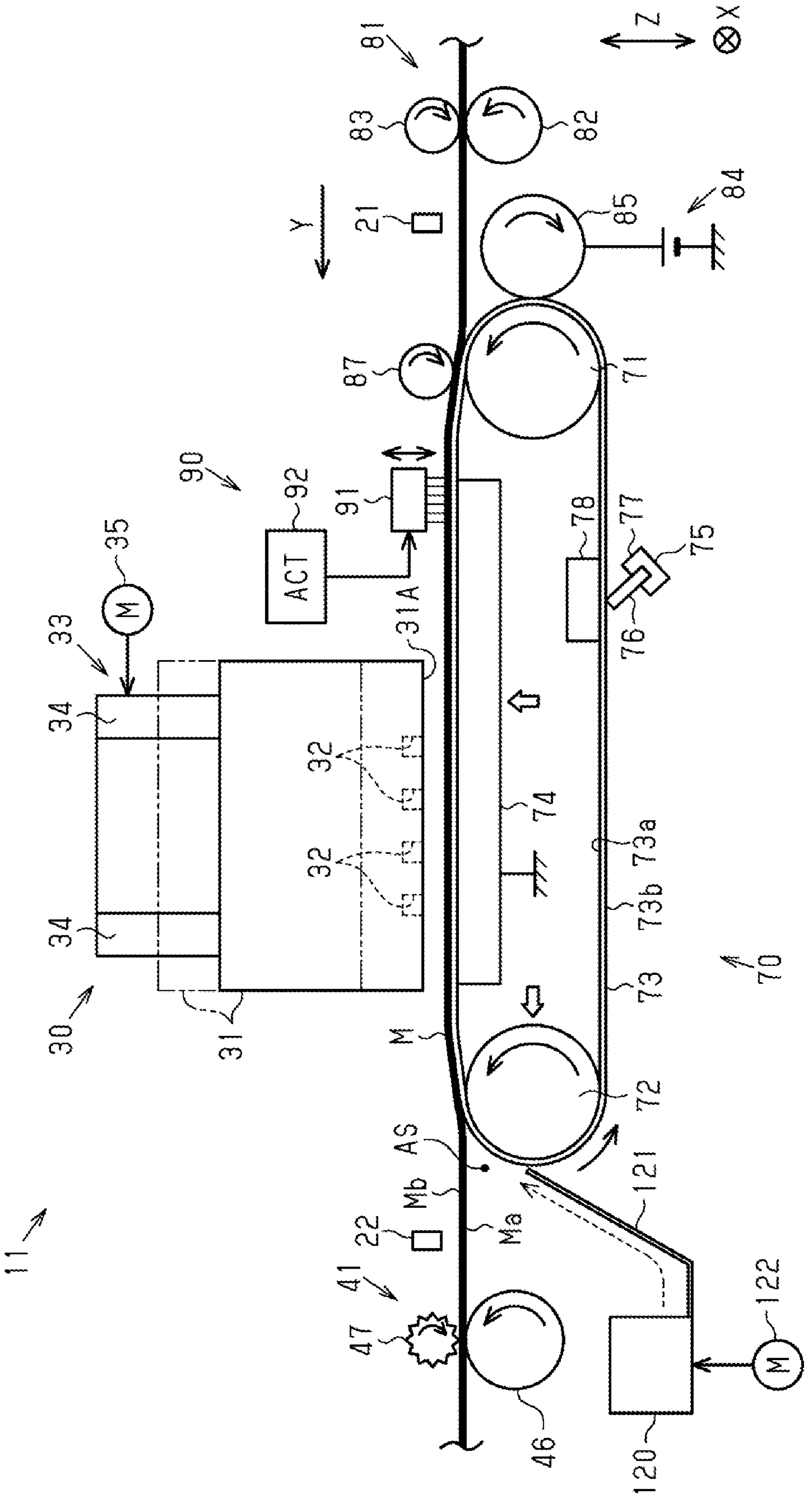
FIG. 2 is a schematic front view illustrating a schematic configuration of an electrostatic conveyance unit.
Figure 3:
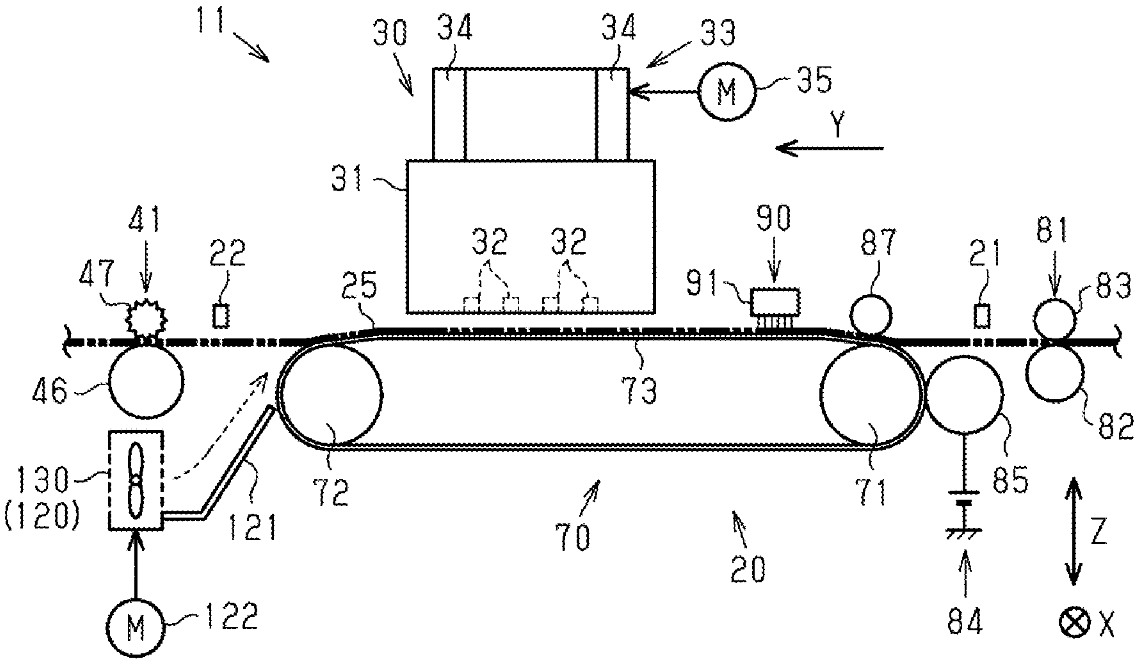
FIG. 3 is a schematic front view illustrating an electrostatic conveyance unit including a peeling unit of the first embodiment.

Next, a configuration of the electrostatic conveyance unit 70 and surrounding members thereof will be described with reference to FIG. 2. As illustrated in FIG. 2, the recording device 11 includes a conveyance belt 73 that adsorbs and conveys the medium M using charge, and a recording unit 30 that performs recording on the medium M conveyed by the conveyance belt 73.

The electrostatic conveyance unit 70 includes a first belt roller 71 disposed upstream of the recording head 31 in the conveyance direction Y, and a second belt roller 72 disposed downstream of the recording head 31 in the conveyance direction Y. Each of rotation axes of the first belt roller 71 and the second belt roller 72 is parallel to the width direction X. Further, the first belt roller 71 is a roller that is coupled to a belt motor 105 (FIG. 11) that is a driving source thereof and can be rotationally driven, and the second belt roller 72 is a roller that is not coupled to a driving source and cannot be rotationally driven.

The endless (annular) conveyance belt 73 is wound around outer circumferences of the first belt roller 71 and the second belt roller 72. The conveyance belt 73 is configured of elastic rubber or resin material. Here, as indicated by a white arrow in FIG. 2, the second belt roller 72 is biased in a direction away from the first belt roller 71 (to the left in the figure). Therefore, tension is applied to the conveyance belt 73 in a rotation direction of the conveyance belt 73 by the second belt roller 72.

When the first belt roller 71 is rotationally driven, the conveyance belt 73 rotates, and the medium M is conveyed in the conveyance direction Y. When the conveyance belt 73 conveys the medium M, the outer surface of the conveyance belt 73 functions as a support surface that comes into contact with the back surface Ma of the medium M and supports the medium M.

Further, the recording unit 30 is disposed at a position facing the support surface of the conveyance belt 73. In other words, the recording unit 30 is disposed at a position facing the conveyance belt 73 with the conveyance path of the medium M interposed therebetween. The recording unit 30 includes the recording head 31 described above. The recording head 31 includes a nozzle surface 31A that is a surface that faces the conveyance belt 73, and the aforementioned nozzle 32 that opens to the nozzle surface 31A.

Further, the recording unit 30 may include an elevating mechanism 33 that raises and lowers the recording head 31. The elevating mechanism 33 includes, for example, an elevating rail 34 that guides the recording head 31 in the vertical direction Z, and a drive source 35 that applies a driving force for raising and lowering the recording head 31 along the elevating rail 34 to the recording head 31. The drive source 35 may be, for example, an electric motor. In this case, the drive source 35 is driven in forward and reverse directions, and the recording head 31 is configured to be able to be raised or lowered between a recording position indicated by a solid line in FIG. 2 and a retracted position indicated by a two-dot chain line in FIG. 2.

In the following description, a surface of the conveyance belt 73 coming into contact with the first belt roller 71 and the second belt roller 72 is referred to as an "inner surface 73*a*", and a surface coming into contact with the back surface Ma of the medium M when the medium M is supported in the conveyance belt 73 is referred to as an "outer surface 73*b*." Further, a path along which the conveyance belt 73 moves when the conveyance belt 73 rotates is also referred to as a "circular path."

As illustrated in FIG. 2, a backup plate 74 that supports the inner surface 73*a* of the conveyance belt 73 is provided directly below the recording head 31 and on the inner side of the circular path of the conveyance belt 73. The backup plate 74 is formed of, for example, a conductive material such as metal, and may be grounded. Further, as indicated by the white arrow in FIG. 2, the backup plate 74 biases the conveyance belt 73 toward the recording head 31. Therefore, tension is applied to the conveyance belt 73 in the rotation direction of the conveyance belt 73 by the backup plate 74.

As illustrated in FIG. 2, a wiping unit 75 that wipes the outer surface 73*b* of the conveyance belt 73 is provided vertically below the conveyance belt 73. The wiping unit 75 includes a cleaning blade 76 that comes into contact with the outer surface 73*b* of the conveyance belt 73, and a blade support portion 77 that supports the cleaning blade 76.

The wiping unit 75 wipes the outer surface 73*b* of the conveyance belt 73 with the cleaning blade 76 while the conveyance belt 73 is rotating. The blade support portion 77 may be provided to be able to be raised or lowered. Accordingly, a contact pressure of the cleaning blade 76 with respect to the conveyance belt 73 can be changed, or the cleaning blade 76 can be retracted to a retracted position at which the cleaning blade 76 does not come into contact with the conveyance belt 73.

Further, a holding portion 78 that holds the conveyance belt 73 together with the wiping unit 75 is provided at a position facing the wiping unit 75 with the conveyance belt 73 interposed therebetween. When the wiping unit 75 wipes the conveyance belt 73, the holding portion 78 supports the conveyance belt 73 from the back surface against the biasing of the cleaning blade 76, thereby improving wiping performance of the conveyance belt 73.

As illustrated in FIG. 2, a supply roller pair 81 that conveys the medium M supplied from the first medium supply unit 51, the second medium supply unit 52, or the third medium supply unit 53 toward the conveyance belt 73 is provided upstream of the conveyance belt 73 in the conveyance direction. The roller pair 81 includes a drive roller 82 that assigns a conveying force to the medium M by being driven and rotated, and a driven roller 83 that is driven to rotate by coming into contact with the medium M that is being conveyed. The driven roller 83 is biased toward the drive roller 82. Further, rotation axes of the drive roller 82 and the driven roller 83 are parallel to the width direction X. The supply roller pair 81 conveys the medium M downstream in the conveyance direction Y in a rotationally driven state.

As illustrated in FIG. 2, a charging unit 84 is provided upstream of the first belt roller 71 in the conveying direction (to the right in the figure). The charging unit 84 includes a charging roller 85. The charging roller 85 has the width direction X as a rotation axis direction, and is in contact with the outer surface 73*b* of the conveyance belt 73. The charging roller 85 is coupled to a power supply, and applied with a DC voltage from the power supply.

The rotation of the first belt roller 71 is transmitted to the charging roller 85 through the conveyance belt 73, so that the charging roller 85 is driven to rotate with respect to the first belt roller 71. In this case, the charging roller 85 supplies charge to a portion of the outer surface 73*b* of the conveyance belt 73 that is in contact with the charging roller 85. In the recording device 11 of the present embodiment, the charging roller 85 supplies positive charge to the conveyance belt 73 to charge the outer surface 73*b* of the conveyance belt 73 with the positive charge. The charging roller 85 may be configured to supply negative charge to the conveyance belt 73 to charge the outer surface 73*b* of the conveyance belt 73 with the negative charge.

Further, a support roller 87 that presses the medium M conveyed to the electrostatic conveyance unit 70 against the conveyance belt 73 is provided upstream of the recording head 31 in the conveyance direction (to the right in the figure). The support roller 87 is made of a conductive material such as metal, and is grounded. The rotation of the first belt roller 71 is transmitted to the support roller 87 through the conveyance belt 73, so that the support roller 87 is driven to rotate with respect to the first belt roller 71.

As illustrated in FIG. 2, an anti-static unit 90 is provided between the support roller 87 and the recording head 31 in the conveyance direction Y. The anti-static unit 90 includes an anti-static brush 91 having a brush that protrudes toward the conveyance belt 73, and an operating unit 92 that adjusts a contact pressure of the anti-static brush 91 with respect to the conveyance belt 73 (the medium M).

The anti-static brush 91 may have a brush formed of a material capable of removing charge from the medium M (for example, a resin material such as conductive nylon). Further, the anti-static brush 91 is formed so that a contact pressure against the conveyance belt 73 (medium M) when the anti-static brush 91 comes into contact with the conveyance belt 73 (the medium M) is uniform in the width direction X.

The operating unit 92 has a mechanism, such as a solenoid, that can move the anti-static brush 91 in a straight line. The operating unit 92 changes the position of the anti-static brush 91 as indicated by the double-headed arrow in FIG. 2, to adjust the contact pressure of the anti-static brush 91 with respect to the conveyance belt 73 (the medium M). For example, when it is necessary to eliminate static electricity of the recording surface Mb of the medium M, the operating unit 92 brings the anti-static brush 91 into contact with the conveyance belt 73 with a contact pressure that is sufficient to bend the outer surface of the conveyance belt 73. On the other hand, when it is not necessary to eliminate the static electricity of the recording surface Mb of the medium M, the operating unit 92 retracts the anti-static brush 91 from the conveyance belt 73.

As illustrated in FIG. 2, a first detection unit 21 that detects the presence or absence of the medium M is provided at a position upstream of the conveyance belt 73 in the conveyance direction Y. The first detection unit 21 detects the medium M sent to the conveyance belt 73 in advance. The control unit 100 detects a leading end and a trailing end of the passing medium M, at a position upstream of the conveyance belt 73 by a predetermined path length, by a detection signal input from the first detection unit 21 being switched between on and off.

Further, a second detection unit 22 that detects the presence or absence of the medium M is provided at a position downstream of the conveyance belt 73 in the conveyance direction Y. The second detection unit 22 detects the medium M discharged from the conveyance belt 73. The control unit 100 detects the leading end and the trailing end of the passing medium M, at a position downstream of the conveyance belt 73 by a predetermined path length, by the detection signal input from the second detection unit 22 being switched between on and off.

The control unit 100 recognizes the position of the medium M on the conveyance path (conveyance position) based on the detection signal from each of the first detection unit 21 and the second detection unit 22. Further, the control unit 100 detects the jam of the medium M that has occurred on the conveyance belt 73, based on the detection signal from each of the first detection unit 21 and the second detection unit 22.

Next, electrostatic adsorption of the medium M by the conveyance belt 73 will be described in detail.

The conveyance belt 73 includes an annular conductive layer formed at the inner side, and an annular insulating layer formed at the outer side of the conductive layer. This insulating layer has a higher electrical resistance than the conductive layer. The outer surface of the insulating layer is the outer surface 73*b* of the conveyance belt 73, and an inner surface of the conductive layer is the inner surface 73*a* of the conveyance belt 73.

When the conveyance belt 73 is rotated through the rotation of the first belt roller 71, the charging roller 85 is driven to rotate, so that positive charge (+) is charged on the outer surface 73*b* side of the conveyance belt 73, that is, on the outer surface side of the insulating layer, and negative charge (−) is charged on the inner surface side of the insulating layer.

When the medium M is pressed against the outer surface 73*b* of the conveyance belt 73 by the support roller 87, the medium M comes into close contact with the conveyance belt 73, and polarization occurs inside the medium M. That is, the back surface Ma of the medium M is negatively charged, while the recording surface Mb of the medium M, which is opposite to the back surface Ma, is positively charged. Thereafter, the positive charge on the recording surface Mb side of the medium M is removed by the anti-static brush 91 that comes into contact with the recording surface Mb, thereby generating an electrostatic adsorption force with respect to the medium M by the conveyance belt 73. In the present embodiment, the conveyance belt 73 is charged with only positive charge (DC charging).

When the conveyance belt 73 is rotated, the conductive layer of the conveyance belt 73 and the backup plate 74 come into sliding contact, so that the conductive layer of the conveyance belt 73 may be unintentionally triboelectrically charged. In this case, although there is concern that the amount of positive charge on the outer surface 73*b* of the conveyance belt 73 may decrease, frictional charging of the conductive layer is curbed since the backup plate 74 is grounded. The conveyance belt 73 may be configured to be alternately charged with the positive charge and the negative charge (AC charging).

Configuration of Peeling Unit 120

Next, a configuration of the peeling unit 120 will be described with reference to FIG. 2. As illustrated in FIG. 2, the recording device 11 includes the peeling unit 120 that peels off the medium M from the conveyance belt 73. Here, when a jam of the medium M occurs on the conveyance belt 73, charging by the charging roller 85 is stopped. However, since the conveyance belt 73 and the medium M are in a charged state, the adsorption force between the conveyance belt 73 and the medium M is maintained. Therefore, when the user removes the jammed medium M, it is necessary to peel off the medium M from the surface of the conveyance belt 73 against the electrostatic adsorption force. In this case, the medium M about to be forcibly peeled off may be torn. When the medium M is torn, removal of the medium M becomes a troublesome task, and it may take time to eliminate the jam. When it takes time to eliminate the jam, a recording waiting time increases, resulting in a decrease in work efficiency of the user who is waiting for recording. In this respect, it is preferable for a jam release time to be short. Therefore, in the present embodiment, the medium M is peeled off from the conveyance belt 73 in advance before the user performs jam release work.

To this end, the recording device 11 includes the peeling unit 120 that peels off the jammed medium M from the conveyance belt 73 when a jam occurs on the conveyance belt 73. In the present embodiment, jam that occurs in a state in which the medium M is on the conveyance belt 73 is referred to as a "first jam." Here, directions in which the medium M is peeled off from the conveyance belt 73 include a first direction in which the medium M is mainly peeled off from the upstream in the conveyance direction Y, and a second direction in which the medium M is peeled off from the downstream in the conveyance direction Y.

In the present embodiment, the cover 15 that is opened and closed by a user in order to perform the jam release work is located downstream of the conveyance belt 73 in the conveyance direction Y. Therefore, priority is given to peeling the medium M on the downstream in which the user performs the jam removal work. Therefore, the peeling unit 120 peels off the medium M in the second direction from downstream to upstream in the conveyance direction Y with respect to the conveyance belt 73.

Therefore, in the present embodiment, the second detection unit 22 which is located downstream of the conveyance belt 73 and detects the presence or absence of the medium M corresponds to an example of the detection unit. That is, the present embodiment is an example in which the detection unit is located downstream of the conveyance belt 73. When a jam occurs, a detection result of the second detection unit 22 is used for a determination as to whether or not an acute angled gap AS illustrated in FIG. 2 is formed.

The peeling unit 120 includes a guide member 121 that guides an insertion target into an interface in which the conveyance belt 73 and the medium M are adsorbed (hereinafter also simply referred to as an "adsorption interface") in order to peel off the medium M from the conveyance belt 73 when a jam occurs. The insertion target may be a fluid such as air, or may be a peeling member having a predetermined shape that can be easily inserted into the adsorption interface. Examples of the peeling member include a sheet-shaped flexible member.

Here, the acute angled gap AS refers to a space portion that is formed by the medium M in a portion spaced apart from the end portion in the conveyance direction Y of the conveyance belt 73 and an arcuate surface formed at the end portion in the conveyance direction Y of the conveyance belt 73 in a front view in FIG. 2 seen from a direction parallel to the rotation axis of the plurality of belt rollers 71, 72 around which the conveyance belt 73 is wound. This acute angled gap AS functions as a guide space that guides a target sent from the peeling unit 120 to the adsorption interface. Therefore, the guide member 121 is provided at a position and an angle such that the target sent from the peeling unit 120 is directed to the acute angled gap AS along a path indicated by a dashed arrow in FIG. 2.

The control unit 100 controls the conveyance unit 20, the recording unit 30, the charging unit 84, the anti-static unit 90, and the peeling unit 120. The control unit 100 controls the power supply and the anti-static unit 90 constituting the charging unit 84 in order to cause the medium M to be adsorbed to the conveyance belt 73. Further, the control unit 100 determines whether or not the jam of the medium M has occurred. The control unit 100 detects a position state of the jammed medium M that stays on the conveyance belt 73 at the time of the occurrence of the jam when the first jam is determined to have occurred, and determines whether or not the acute angled gap AS illustrated in FIG. 2 is formed between the medium M and the conveyance belt 73 on the downstream in the conveyance direction Y in which the peeling unit 120 is located with respect to the conveyance belt 73. The control unit 100 determines whether the acute angled gap AS is formed, based on the detection result of the second detection unit 22, which is an example of a detection unit. The control unit 100 of the present embodiment causes the peeling unit 120 to perform a peeling operation in a state in which the acute angled gap AS has been formed.

Figure 11:
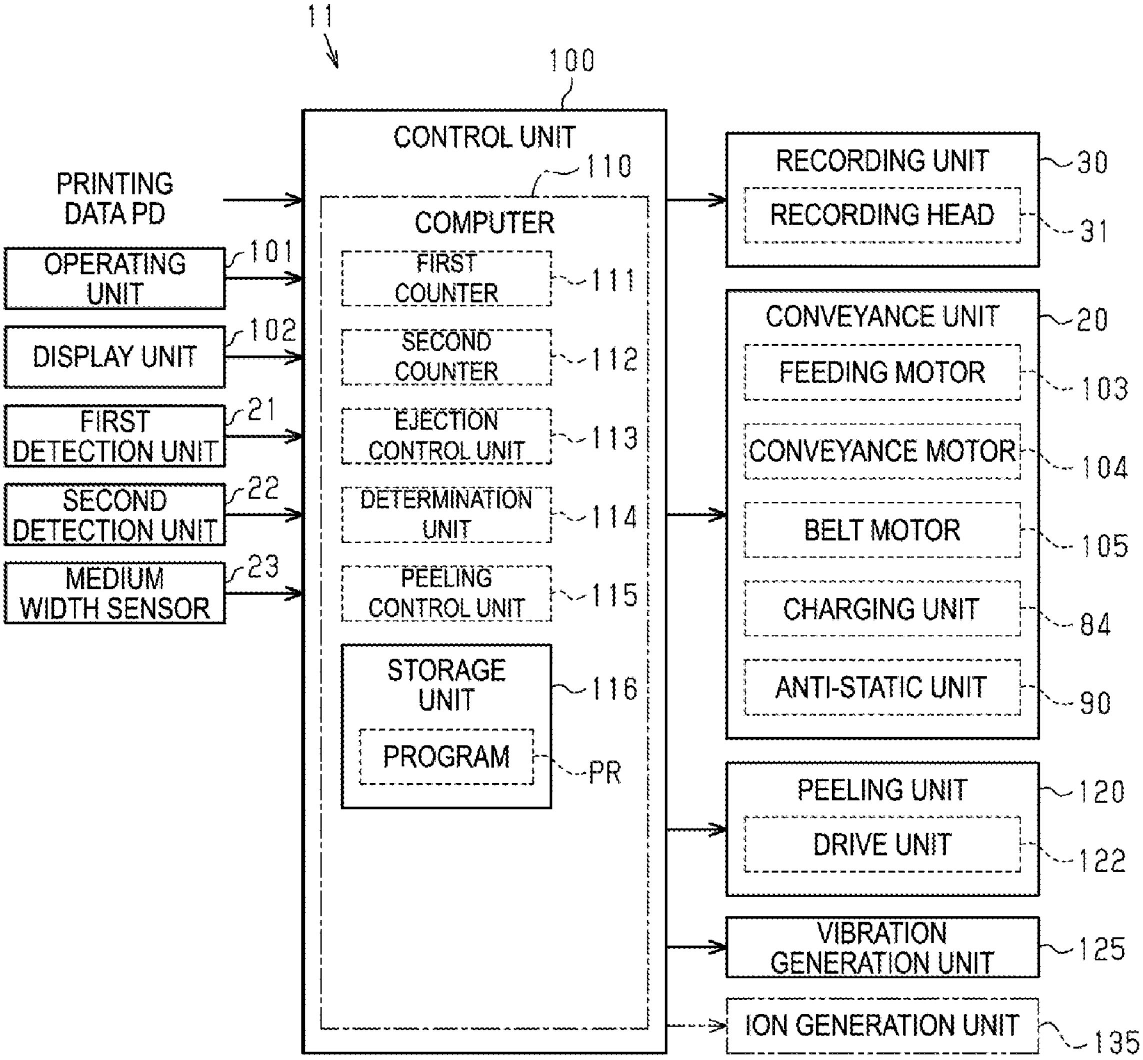
FIG. 11 is a block diagram illustrating an electrical configuration of a recording device.

When the control unit 100 detects the jam of the medium M on the conveyance belt 73, the control unit 100 performs a peeling operation of peeling off the medium M from the conveyance belt 73 through drive of the peeling unit 120, and then displays a message including information indicating that the jam has occurred and information for urging elimination of the jam on a display unit 102 (see FIG. 11). The user reading the message opens the cover 15 (see FIG. 1) to remove the jammed medium M. The user eliminating the jam performs an "OK" operation using an operating unit 101 (see FIG. 11) to notify the recording device 11 that the jam has been eliminated. When the control unit 100 receives the notification that the jam has been eliminated from the operating unit 101, the control unit 100 resumes a recording operation interrupted due to the jam.

First Example

Figure 4:
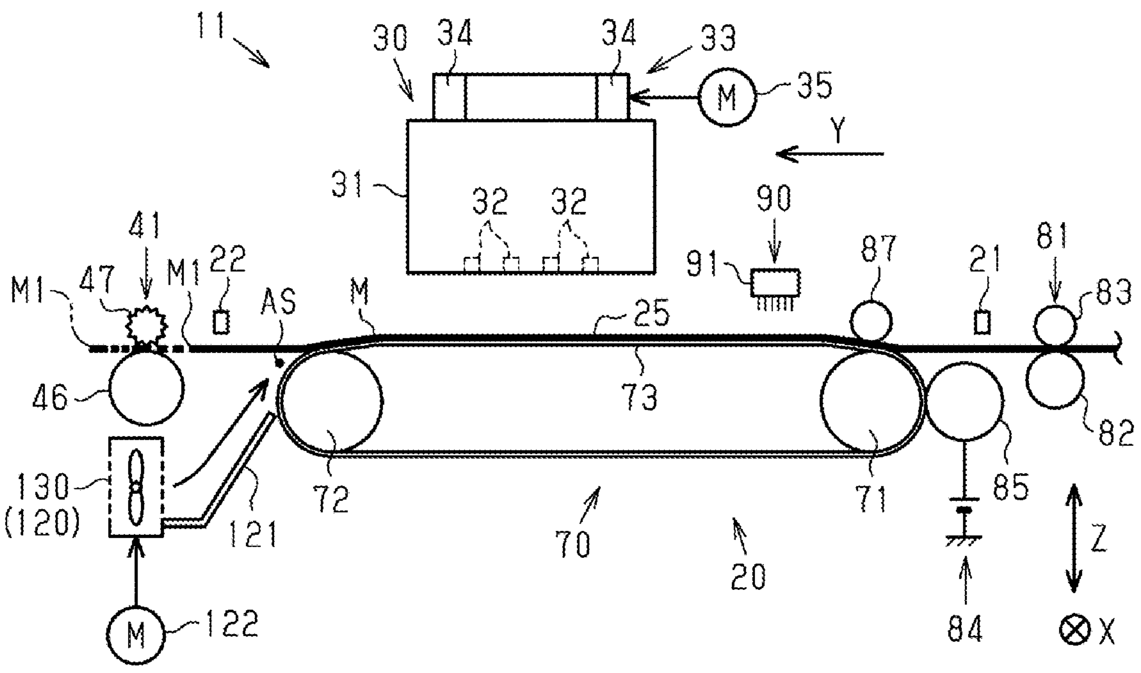
FIG. 4 is a schematic front view illustrating the electrostatic conveyance unit illustrating an operation of the peeling unit.

Next, a configuration of the first embodiment of the peeling unit 120 will be described with reference to FIGS. 3 to 8. In the first embodiment, a sending target is a fluid such as an air flow. The recording device 11 illustrated in FIG. 3 includes the peeling unit 120 that peels off the medium M from the conveyance belt 73 using blowing air. The peeling unit 120 is disposed below the conveyance path 25. When there is the medium M staying on the conveyance belt 73 at the time of occurrence of the jam, the peeling unit 120 peels off the medium M from the conveyance belt 73 through air flow by blowing air toward the acute angled gap AS illustrated in FIG. 4, in a state in which the acute angled gap AS (see FIGS. 4 and 8) is formed between the conveyance belt 73 and the medium M. Thus, the peeling unit 120 reduces concern of damage to the conveyance belt 73 when peeling off the medium M.

Figure 6:
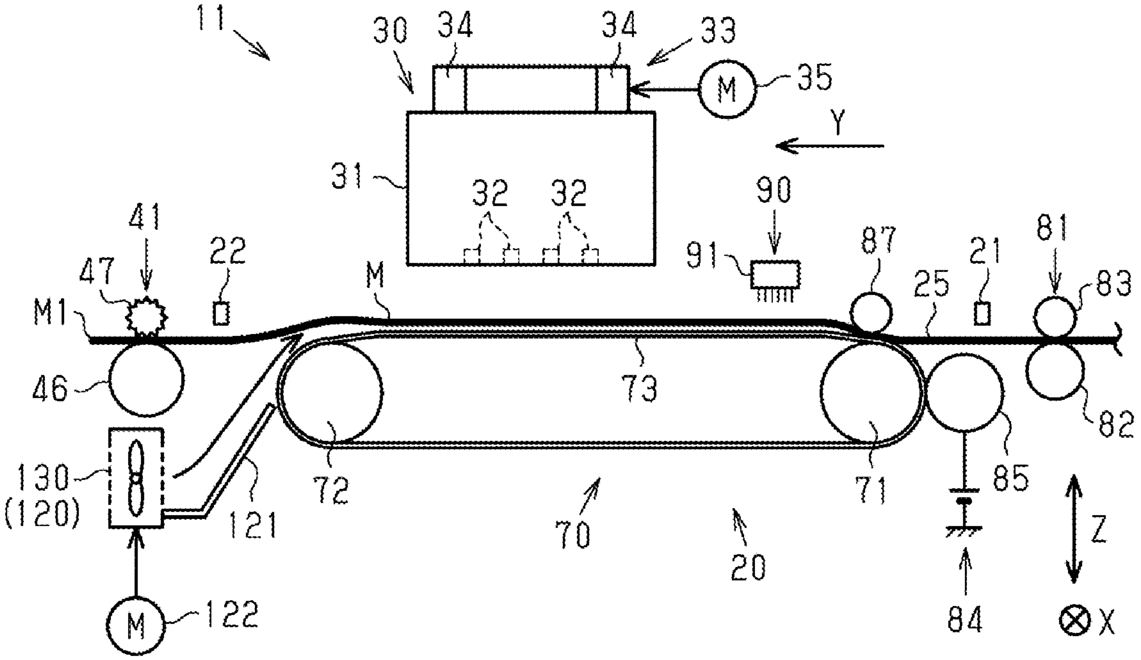
FIG. 6 is a schematic front view illustrating the electrostatic conveyance unit illustrating the operation of the peeling unit.
Figure 7:
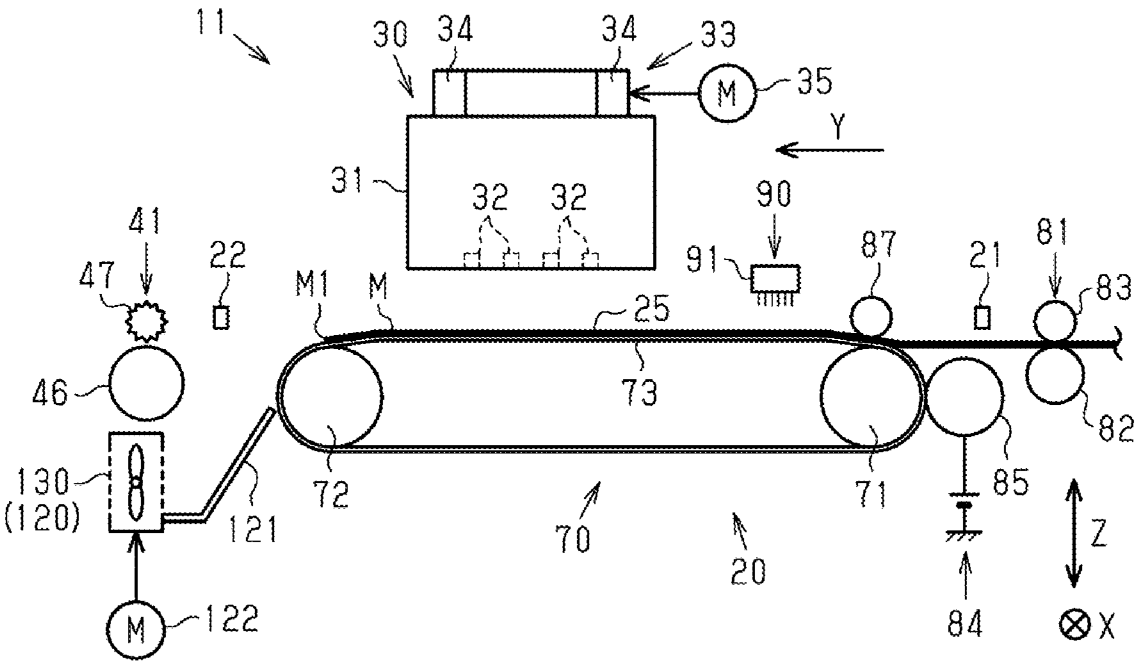
FIG. 7 is a schematic front view illustrating the electrostatic conveyance unit illustrating the operation of the peeling unit.

The control unit 100 drives the peeling unit 120. The peeling unit 120 of the present embodiment is a fan 130 that can blow air. The control unit 100 drives the fan 130. The air flow blown from the fan 130 is guided along a predetermined path along the guide member 121 and is sent into the acute angled gap AS. For example, as illustrated in FIG. 4, when an air flow is sent along the adsorption interface between the conveyance belt 73 and the medium M, the medium M is peeled off from the conveyance belt 73 by the air flow. A drive time of the fan 130 is set to a drive time required from a time when the peeling is started as illustrated in FIG. 4 by the air flow to a time when the peeling of the medium M is completed as illustrated in FIG. 6. The drive time is, for example, a predetermined value within a range of 1 to 10 seconds.

In the example illustrated in FIG. 6, the conveyance unit 20 does not include a release mechanism that releases nip of the medium M that is nipped between the support roller 87 and the conveyance belt 73. Therefore, the medium M is peeled off from the conveyance belt 73 in a region on the downstream in the conveyance direction Y relative to a position at which the support roller 87 nips the medium M. The conveyance unit 20 may include the release mechanism that releases the nip of the medium M that is nipped between the support roller 87 and the conveyance belt 73. In this case, the control unit 100 drives the release mechanism when the jam occurs, thereby retracting the support roller 87 to a nip release position spaced apart with respect to the conveyance belt 73 from a nip position illustrated in FIGS. 2 to 6 and the like. According to this configuration, it is possible to substantially completely peel off the medium M from the conveyance belt 73 using the peeling unit 120.

As illustrated in FIG. 4, when the second detection unit 22 detects the medium M at the time of occurrence of the jam, the control unit 100 drives the fan 130, which is an example of the peeling unit 120, to blow air toward the acute angled gap AS formed by the conveyance belt 73 and the medium M. This air blow causes the medium M to be peeled off from the conveyance belt 73 (see FIGS. 5 and 6).

Figure 8:
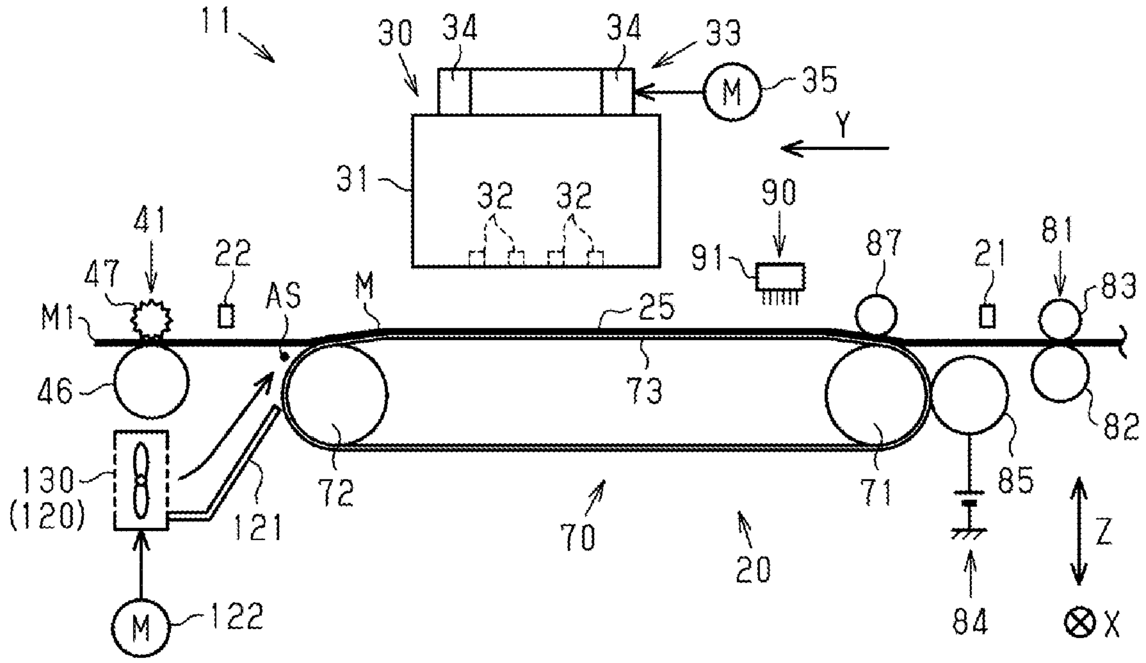
FIG. 8 is a schematic front view illustrating the electrostatic conveyance unit illustrating the operation of the peeling unit.

On the other hand, when the second detection unit 22 does not detect the medium M at the time of occurrence of the jam (see FIG. 7), the control unit 100 drives the conveyance belt 73 to convey the medium M to the position at which the medium M is detected by the second detection unit 22 (see FIG. 8). The fan 130 blows air toward the acute angled gap AS formed between the conveyance belt 73 and the medium M (see FIG. 8).

The fan 130 may change an amount of blowing air according to a size of the medium M (hereinafter also referred to as a "medium size"). Methods for changing the amount of blowing air include a first method of changing the amount of blowing air of the fan 130, and a second method of changing the number of fans 130 that blow air among a plurality of fans 130. The recording device 11 includes a medium width sensor 23 (see FIG. 11) that detects a width of the medium M. The control unit 100 may acquire the medium size from a detection result of the medium width sensor 23.

In the first method, the fan 130 may change the amount of blowing air according to the medium size based on medium width information detected by the medium width sensor 23. For example, the fan 130 blows air at a first amount of blowing air when the medium size is a first size, and the fan 130 blows air at a second mount of blowing air larger than the first amount of blowing air when the size of the medium M is a second size larger than the first size.

Further, in the second method, a plurality of (for example, N) fans 130 are disposed in the width direction X. For example, when the medium size is the first size, a first number of (for example, M (M<N)) fans 130 may blow air, and when the medium size is a second size larger than the first size, a second number of (for example, N) fans 130, which is larger than the first number, may blow air.

Thus, the control unit 100 may change the amount of blowing air or the number of drives of the fan 130 based on the medium width information detected by the medium width sensor 23.

Second example

Next, a configuration of a second embodiment of the peeling unit 120 will be described with reference to FIGS. 9 and 10. The recording device 11 of the second embodiment further includes an ion generation unit 135, in addition to the peeling unit 120 of the first embodiment. The other configuration of the recording device 11 is the same as that in the first embodiment.

Figure 9:
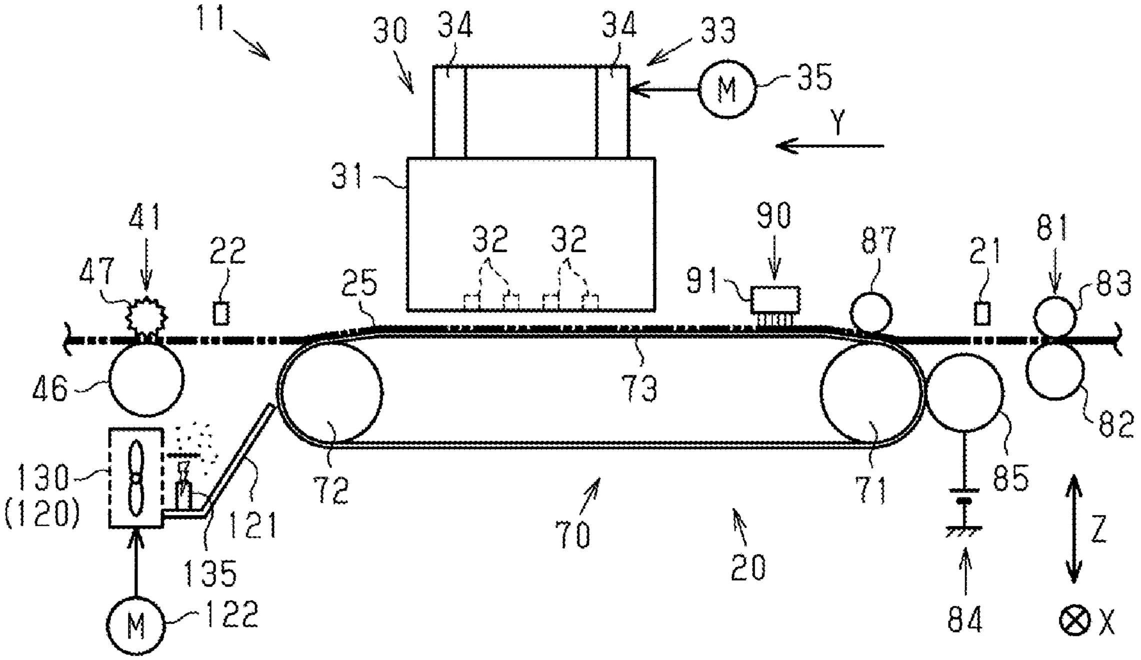
FIG. 9 is a schematic front view illustrating the electrostatic conveyance unit illustrating the operation of the peeling unit of a second embodiment.

As illustrated in FIG. 9, the recording device 11 includes the ion generation unit 135 that generates ions. The ion generation unit 135 is disposed on a ventilation path of the fan 130, which is an example of the peeling unit 120. The fan 130 blows air containing the ions generated by the ion generation unit 135.

For example, when the control unit 100 detects the first jam, the control unit 100 drives the ion generation unit 135 so that the ions are generated. The ions generated by the ion generation unit 135 are charged with an opposite polarity to the charge on the conveyance belt 73. For example, in the example of the first embodiment, the outer surface **73*b* of the insulating layer of the conveyance belt 73 is positively charged. Therefore, the ion generation unit 135 generates negatively charged negative ions that can neutralize the positive charge on the outer surface 73***b* of the conveyance belt 73. In the case of a configuration in which the outer surface 73*b* of the conveyance belt 73 is charged with negative charge, the ion generation unit 135 may be configured to generate positive ions charged with positive charge that can neutralize the negative charge charged on the outer surface 73*b*.

When the first jam occurs, the control unit 100 performs basically the same control as in the first embodiment. A difference from the first embodiment is that, in a peeling operation in which the fan 130 blows an air flow toward the acute angled gap AS, the fan 130 blows an air flow containing the ions generated by the ion generation unit 135.

Figure 10:
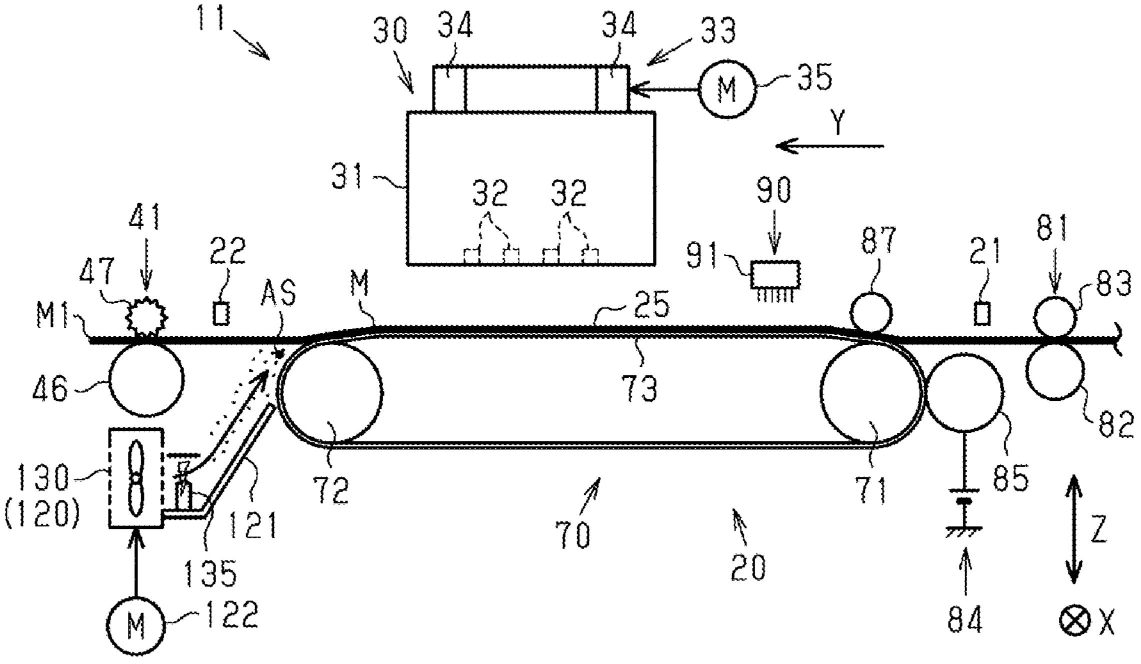
FIG. 10 is a schematic front view illustrating the electrostatic conveyance unit illustrating the operation of the peeling unit.

Therefore, as illustrated in FIG. 10, the fan 130 sends an air flow containing the ions generated by the ion generation unit 135 toward the acute angled gap AS formed between the medium M and the conveyance belt 73.

When the first jam occurs, the control unit 100 stops operations of the conveyance unit 20 and the recording head 31. Further, the control unit 100 controls the drive source 35 of the elevating mechanism 33 so that the recording head 31 is raised from the recording position to the retracted position, thereby retracting the recording head 31 upward.

Further, the control unit 100 drives the peeling unit 120. The control unit 100 of the present embodiment drives the fan 130. The air flow blown from the fan 130 is guided to the predetermined path along the guide member 121 and is sent into the acute angled gap AS. For example, as illustrated in FIG. 10, an air flow is sent along an adsorption surface between the conveyance belt 73 and the medium M, and the medium M is peeled off from the conveyance belt 73 by the air flow.

Further, the control unit 100 controls a drive amount or the number of drives of the fan 130 based on the medium width information detected by the medium width sensor 23, as in the first embodiment.

Electrical Configuration of Recording Device 11

Next, an electrical configuration of the recording device 11 will be described with reference to FIG. 11.

As illustrated in FIG. 11, the recording device 11 includes the control unit 100 described above. The control unit 100 can be configured as a circuit including a: one or more processors that execute various processes according to a computer program, β: one or more dedicated hardware circuits that execute at least some of the various processes, and y: a combination thereof. The hardware circuit is, for example, an application-specific integrated circuit. The processor includes a CPU, and a memory such as a RAM and ROM, and the memory stores program code or instructions configured to cause the CPU to execute a process. The memory or a computer-readable media includes any readable medium that can be accessed by a general purpose or special purpose computer.

The operating unit 101, the display unit 102, the first detection unit 21, the second detection unit 22, and the medium width sensor 23 are electrically coupled as an input system to the control unit 100. The operating unit 101 is operated in order for a user to give instructions to the recording device 11. The control unit 100 receives an operation signal based on an operation of the user from the operating unit 101. The display unit 102 includes a display mechanism that displays various menu screens and the like. When the display unit 102 is configured of a touch panel, for example, a touch operation function thereof may be configured as at least a part of the operating unit 101. The display unit 102 also has a reporting function that displays information indicating that an abnormality has occurred to the user. For example, when the jam is detected, the control unit 100 displays report information such as a message indicating that the jam has occurred and prompting the jam release work on the display unit 102 to notify the user of the occurrence of an abnormality.

Further, the first detection unit 21 and the second detection unit 22 detect the presence or absence of the medium M at respective detection positions thereof. The control unit 100 detects the position of the medium M being conveyed (conveyance position) based on the detection signal from each of the first detection unit 21 and the second detection unit 22, and detects the jam in which the medium M is jammed in the middle of the conveyance path 25.

Further, the medium width sensor 23 detects the width of the medium M. Specifically, the medium width sensor 23 detects both ends in the width direction X of the medium M that is conveyed as a recording target. The control unit 100 acquires the medium width information, which is information on the width of the medium M, based on the detection signal input from the medium width sensor 23. The medium width information includes at least of the position of the medium M in the width direction X and the width size. The control unit 100 detects the width of the medium M, to determine whether the width of the actually conveyed medium M matches the medium size designated by the recording condition information. Further, the control unit 100 detects an amount of deviation of the medium M in the width direction X based on the detection signal of the medium width sensor 23, and adjusts the recording position in the width direction X according to the amount of deviation.

Further, the control unit 100 may specify the size of the medium M that is peeled off from the surface of the conveyance belt 73 at the time of occurrence of the first jam, based on the medium width information. The size of the medium M may be specified, and the amount of blowing air of the fan 130 required to peel off the medium M from the conveyance belt 73 may be controlled. Further, a plurality of fans 130 may be disposed in the width direction X. In this case, the control unit 100 may determine the number of drives of the fan 130 to be driven based on the medium width information. That is, the control unit 100 may drive the number of fans 130 based on the medium width information. A drive amount (for example, the amount of blowing air) or the number of drives of the peeling unit 120 (the fan 130) may be determined based on information on the medium size included in the recording condition information, instead of the medium width information acquired from the medium width sensor 23.

Further, the recording unit 30, the conveyance unit 20, the charging unit 84, the anti-static unit 90, the peeling unit 120, the vibration generation unit 125, and the ion generation unit 135 are electrically coupled as an output system to the control unit 100, as illustrated in FIG. 11. The control unit 100 performs ejection control of the recording head 31 constituting the recording unit 30. A feeding motor 103, a conveyance motor 104, and a belt motor 105 constituting the conveyance unit 20 are electrically coupled to the control unit 100. The control unit 100 controls the feeding motor 103, the conveyance motor 104, and the belt motor 105. The control unit 100 may control the drive of the supply roller pair 81 and the first medium supply unit 51, the second medium supply unit 52, or the third medium supply unit 53 so that a skew removal operation of eliminating the skew of the medium M conveyed to the conveyance belt 73 is performed.

The control unit 100 receives print data PD. The control unit 100 drives and controls the recording unit 30 and the conveyance unit 20 based on the print data PD to perform printing control for recording on the medium M. The print data PD includes a print command, print condition information, and image data. The printing condition information includes a type of medium, size, color/monochrome printing mode, and the like.

The control unit 100 controls the recording head 31. Here, the image data included in the print data PD is dot data. The amount of ink ejected from the nozzles 32 of the recording head 31 is determined according to dot information of the image data. A size of ink droplets may be divided into a plurality of stages, and gradation recording in which ink droplets with different sizes are separated may be performed. For example, types of a size of the ink droplets may be two types including large and small, may be three types including large, medium and small, or may be a plurality of types such as four or more types.

The control unit 100 controls the drive source 35 of the elevating mechanism 33 constituting the recording unit 30. The control unit 100 controls the elevating mechanism 33 to raise and lower the recording head 31 between the recording position and the retracted position.

The control unit 100 controls the charging unit 84. Specifically, the control unit 100 controls a power supply of the charging unit 84 to change a magnitude of the DC voltage applied to the charging roller 85. For example, when the DC voltage applied to the charging roller 85 increases, an amount of charge charged on the conveyance belt 73 charged by the charging roller 85 and the medium M charged by the conveyance belt 73 also increases. As a result, the electrostatic adsorption force of the conveyance belt 73 with respect to the medium M increases. That is, the control unit 100 controls the power supply to adjust an amount of charge charged on the charging roller 85 and change the electrostatic adsorption force with respect to the medium M by the conveyance belt 73. Further, when a jam is detected, the control unit 100 controls the power supply of the charging unit 84 so that the power supply is turned off, to stop the application of the DC voltage to the charging roller 85.

The control unit 100 controls the anti-static unit 90. When the amount of charge on the conveyance belt 73 is increased, the control unit 100 may increase the contact pressure of the anti-static brush 91 against the recording surface Mb of the medium M, as compared to a case in which the amount of charge is decreased. Incidentally, since the amount of charge on the conveyance belt 73 has a correlation with the DC voltage that the power supply of the charging unit 84 applies to the charging roller 85, the contact pressure of the anti-static brush 91 may be changed depending on the DC voltage that the power supply of the charging unit 84 applies to the charging roller 85.

Further, the control unit 100 controls a drive unit 122 of the peeling unit 120. In the present embodiment, since the peeling unit 120 is the fan 130, the control unit 100 drives and controls a fan motor, which is the drive unit 122 of the fan 130. Moreover, in the case of a configuration in which the ion generation unit 135 is included, the control unit 100 drives the ion generation unit 135 together with the drive unit 122 of the fan 130. When the control unit 100 detects the jam of the medium M on the conveyance belt 73, the control unit 100 may drive the ion generation unit 135 before the drive unit 122. Further, in the case of a configuration in which the vibration generation unit 125 is included, the control unit 100 may drive the vibration generation unit 125. The vibration generated by the vibration generation unit 125 is propagated to the conveyance belt 73, and the conveyance belt 73 vibrates. Thus, the vibration generation unit 125 vibrates the conveyance belt 73 to assist in peeling off the medium M from the conveyance belt 73 through the vibration. When the first jam occurs, the control unit 100 may drive only the drive unit 122, may drive both the drive unit 122 and the ion generation unit 135, or may drive three units including the drive unit 122, the ion generation unit 135, and the vibration generation unit 125.

Further, the control unit 100 controls the drive amount or the number of drives of the peeling unit 120 based on the medium width information detected by the medium width sensor 23. For example, when the medium width based on the detected medium width information is a maximum width, the control unit 100 drives the fan 130 with a maximum drive amount. In other words, when the medium width based on the detected medium width information is a first width, the control unit 100 drives the fan 130 with a first drive amount. When the medium width based on the detected medium width information is a second width larger than the first width, the control unit 100 drives the fan 130 with a second drive amount larger than the first drive amount. A plurality of fans 130 serving as the peeling units 120 may be disposed in the width direction X. When the medium width based on the detected medium width information is the first width, the control unit 100 drives the fans 130 with a first number. When the medium width based on the detected medium width information is a second number larger than the first number, the control unit 100 may drive the fans 130 with a second number larger than the first number.

The control unit 100 includes a computer 110. The computer 110 includes a first counter 111 and a second counter 112. Further, the computer 110 includes an ejection control unit 113, a determination unit 114, a peeling control unit 115, and a storage unit 116. The storage unit 116 stores a program PR. The program PR includes a recording control routine shown in a flowchart of FIG. 12. The ejection control unit 113, the determination unit 114, and the peeling control unit 115 may be configured of software constructed by the computer 110 executing the program PR or hardware configured of an electronic circuit such as an ASIC. Further, the ejection control unit 113, the determination unit 114, and the peeling control unit 115 may be configured of the software and the hardware in cooperation. In the present embodiment, the ejection control unit 113, the determination unit 114, and the peeling control unit 115 include software at least partially.

The first counter 111 counts a value indicating the position of the medium M on the conveyance path. For example, when the leading end of the medium M is detected by the first detection unit 21, the first counter 111 is reset, and then counts the number of input pulses or the number of pulse edges from a rotary encoder (not illustrated) that detects the rotation of the conveyance motor 104. The count value of the first counter 111 indicates a conveyance position that is the position on the conveyance path of the medium M starting from a first detection position (for example, zero) when the leading end of the medium M is detected by the first detection unit 21. The control unit 100 recognizes a conveyance position of the medium M from the count value of the first counter 111.

The second counter 112 counts an amount of conveyance of the medium M from the first detection position when the leading end or the trailing end of the medium M is detected by the first detection unit 21. The second counter 112 sets, as a target count value, a count value corresponding to a target path length obtained by adding a predetermined margin to a predetermined path length along the conveyance path 25 from the first detection position to a second detection position which is a detection position of the second detection unit 22. The second counter 112, for example, may be configured to count down until the target count value becomes zero.

The ejection control unit 113 controls the recording head 31. Specifically, the ejection control unit 113 controls the recording head 31 based on the image data included in the print data PD. The ejection control unit 113 drives and controls an ejection drive element corresponding to the nozzles 32 of the recording head 31 with a duty value based on a pixel value of the image data, to control the size (amount) of ink droplets ejected from the nozzles 32. The ejection drive element may be any of a piezoelectric element, an electrostatic element, and a heater element.

The determination unit 114 determines whether or not a jam of the medium M has occurred. The jam includes a first jam that is a jam that occurs in a state in which the medium M is on the conveyance belt 73. The first jam is a jam that has occurred in a state in which the medium M is present on the conveyance belt 73. The determination unit 114 detects the first jam regardless of the medium M detected by the first detection unit 21 has been conveyed by a target path length obtained by adding a predetermined margin to a predetermined conveyance amount required until the medium M is detected by the second detection unit 22 since the second detection unit 22 does not detect the leading end or the trailing end of the medium M detected by the first detection unit 21. The determination unit 114 uses the second counter 112 to detect this first jam. The determination unit 114 detects the first jam since the determination unit 114 does not receive a detection signal indicating that the medium M has been detected from the second detection unit 22 even when the second counter 112 counts the target count value. The determination unit 114 performs a jam determination process for detecting the jam during recording, and when the jam is detected as a result of the jam determination process, the determination unit 114 determinates whether or not the detected jam is the first jam in which the medium M is jammed in a state in which the medium M is present on the conveyance belt 73. The determination unit 114 also detects a second jam in which the medium M is jammed at a position other than the conveyance belt 73, based on a detection signal from a detection unit (not illustrated) that detects the presence or absence of the medium M on the conveyance path.

The peeling control unit 115 drives and controls the peeling unit 120 to cause the peeling unit 120 to perform a peeling operation of peeling off the medium M adsorbed to the conveyance belt 73 from the conveyance belt 73 when the first jam occurs. When the second detection unit 22, which is an example of a detection unit, detects the medium M at the time of occurrence of the first jam, the peeling control unit 115 peels off the medium M from the conveyance belt 73 by sending a feeding target such as a fluid (air flow) toward the acute angled gap AS formed between the conveyance belt 73 and the medium M with respect to the peeling unit 120. Further, when the second detection unit 22 does not detect the medium M at the time of occurrence of the first jam, the control unit 100 drives the conveyance belt 73 so that medium M is conveyed to the position at which the medium M is detected by the second detection unit 22.

In the present embodiment, the medium M is conveyed downstream in the conveyance direction Y. Through the conveyance of the medium M, the control unit 100 forms the acute angled gap AS between the medium M and the conveyance belt 73 on the downstream in the conveyance direction Y of the conveyance belt 73. In this case, a position to which the medium M is conveyed may be a position at which the medium M is detected by the second detection unit 22. At the position to which the medium M is conveyed, a leading end portion of the medium M may not be nipped by the roller pair 41 (a position of the medium M indicated by a solid line in FIG. 4), or may be nipped by the roller pair 41 (a position of the medium M indicated by a two-dot chain line in FIG. 4).

The peeling unit 120 in the first embodiment is the fan 130 that generates an air flow to peel off the medium M from the conveyance belt 73. The control unit 100 blows the air flow generated by driving the fan 130 toward the acute angled gap AS along the guide member 121.

In the second embodiment, the control unit 100 further drives the ion generation unit 135 to blow the ions toward the acute angled gap AS together with the air flow from the fan 130. The air flow blown into the acute angled gap AS peels off the medium M from the conveyance belt 73 according to a force flowing into the adsorption interface while spreading corners of the acute angled gap AS.

Effects of First Embodiment

Next, an operation of the recording device 11 in the first embodiment will be described. Recording control including peeling control when a jam is detected in the recording device 11 will be described with reference to FIG. 12.

Figure 12:
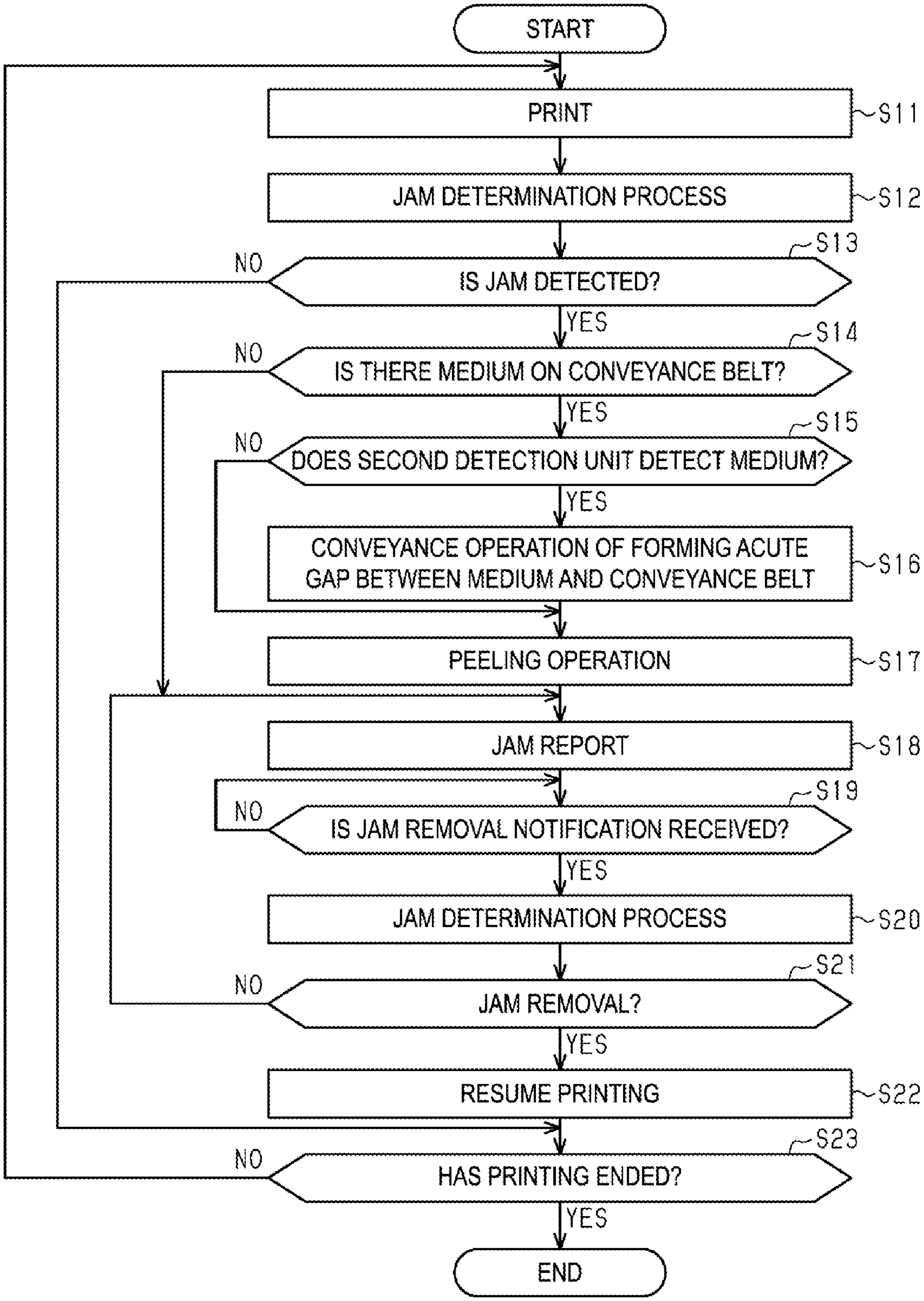
FIG. 12 is a flowchart illustrating print control.

The computer 110 in the control unit 100 executes the program PR shown in the flowchart of FIG. 12 to perform recording control of the recording device 11 This recording control includes peeling control for peeling off the medium M from the conveyance belt 73 when the jam is detected in a state in which the medium M is on the conveyance belt 73 during recording. Hereinafter, the recording control executed by the computer 110 will be described.

First, in step S11, the computer 110 performs printing. That is, a printing process instructed by the print data PD is performed. In the case of a serial recording scheme, the printing process includes a conveyance operation of conveying the medium M to the next recording position, and a recording operation of recording an image or the like by ejecting liquid such as ink from the recording head 31 onto the medium M that is at the recording position.

In the next step S12, the computer 110 performs the jam determination process. The computer 110 determines whether or not a jam has occurred in the medium M based on detection results of a plurality of detection units including the first detection unit 21 and the second detection unit 22 capable of detecting the presence or absence of the medium M on the conveyance path.

In the next step S13, the computer 110 determines whether or not the jam has been detected. That is, the computer 110 determines whether or not the jam has been detected as a result of the jam determination process. The jam includes a first jam that occurs when the medium M is on the conveyance belt 73, and a second other jam that occurs on a conveyance path other than the conveyance belt 73. When the computer 110 detects the jam, the process proceeds to step S14, and when the computer 110 does not detect the jam, the computer 110 returns to step S11 and continues the printing.

In the next step S14, the computer 110 determines whether or not the medium M is present on the conveyance belt 73. That is, the computer 110 determines whether or not the jam is the first jam. When the medium M is present on the conveyance belt 73, the process proceeds to step S15, and when the medium M is not present on the conveyance belt 73, the process proceeds to step S23. The process of step S23 is a process for determining whether or not the printing has ended, and is a process independent of the jam determination process. Therefore, in FIG. 12, steps S12 and S23 are depicted as a serial process for convenience, but a printing end determination process in step S23 does not necessarily need to be performed after the jam determination process in step S12. For example, the process of step S23 may be performed each time printing of one sheet ends. In step S23, when there are still printing targets and the printing has not ended, the process returns to step S11. Therefore, unless an abnormality such as a jam occurs, the printing continues until the printing all ends. Further, when the computer 110 detects the first jam in which the medium M is on the conveyance belt 73, the computer 110 drives the drive source 35 of the elevating mechanism 33 to raise the recording head 31 from a recording position illustrated in FIG. 3 to a retracted position illustrated in FIG. 4. Further, when the computer 110 detects the first jam, the computer 110 turns off the power supply of the charging unit 84.

In the next step S15, the computer 110 determines whether or not the second detection unit 22 has detected the medium M. Here, the second detection unit 22 determines whether the leading end (downstream end) of the medium M is located downstream of the downstream end of the conveyance belt 73 by a predetermined amount or more in the conveyance direction Y. This predetermined amount corresponds to a distance greater than or equal to a distance on the conveyance path 25 from the downstream end of the conveyance belt 73 to the detection position of the second detection unit 22. That is, a determination is made in this step S15 as to whether or not the acute angled gap AS has been formed between the medium M and the conveyance belt 73. A state in which the acute angled gap AS has been formed includes both a state in which the medium M detected by the second detection unit 22 is not nipped by the roller pair 41 and a state in which the medium M is nipped by the roller pair 41. When the second detection unit 22 has detected the medium M and the acute angled gap AS has been formed, the process proceeds to step S17. On the other hand, when the second detection unit 22 does not detect the medium M and the acute angled gap AS is not formed, the process proceeds to step S16.

In step S16, the computer 110 performs a conveyance operation of forming the acute angled gap AS between the medium M and the conveyance belt 73. There are mainly two types of conveyance operations of forming this acute angled gap AS. One is a first conveyance operation of conveying the medium M until the medium M is detected by the second detection unit 22. The other one is a second conveyance operation of conveying the medium M from a time when the medium M is detected by the second detection unit 22 to a time when the leading end portion of the medium M is nipped by the roller pair 41. In the first conveyance operation, the medium M is conveyed to a position indicated by a solid line illustrated in FIG. 4. At this position, the leading end Ml of the medium M is located between the second detection unit 22 and the roller pair 41. On the other hand, in the second conveyance operation, the medium M is conveyed to a position indicated by a two-dot chain line in FIG. 4 so that the leading end portion of the medium M is nipped by the roller pair 41. When the medium M is a thick and hard medium, such as a cardboard or board, the first conveyance operation may be used, but when the medium M is a soft medium such as thin paper, the second conveyance operation is preferable. Hereinafter, an example in which the second conveyance operation is adopted in order for the peeling unit 120 to more reliably perform guidance of the sending target to the adsorption interface at the time of the peeling operation will be described. In step S15, when the second detection unit 22 detects the medium M, the conveyance operation may be performed up to a position at which the medium M is nipped by the roller pair 41 in order to ensure that the medium M is nipped by the roller pair 41. A conveyance amount of this conveyance operation corresponds to a distance obtained by adding a predetermined margin distance to a distance on the conveyance path 25 from the detection position of the second detection unit 22 to a nip position of the roller pair 41.

Figure 5:
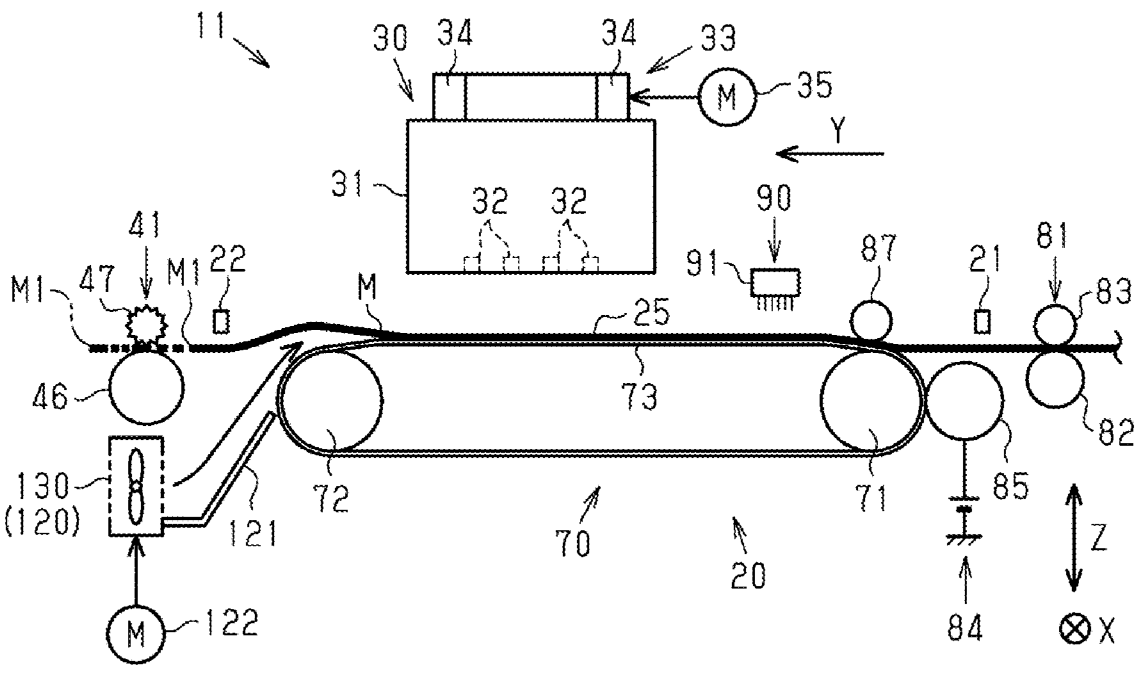
FIG. 5 is a schematic front view illustrating the electrostatic conveyance unit illustrating the operation of the peeling unit.

In step S17, the computer 110 performs a peeling operation. Specifically, the peeling unit 120 of the first embodiment is the fan 130. The computer 110 drives the fan 130. The air flow blown by the fan 130 is guided by the guide member 121 and sent into the acute angled gap AS. As the acute angled gap AS gradually narrows, a flow rate of the air flow sent into the acute angled gap AS gradually increases, and the air flow reliably flows into the adsorption interface between the medium M and the conveyance belt 73. According to the pressure of this air flow, the medium M is be peeled off from the downstream end of the conveyance belt 73, as illustrated in FIG. 5, and is peeled off to the vicinity of the upstream end of the conveyance belt 73, as illustrated in FIG. 6. In addition, in the configuration of the second embodiment, as illustrated in FIG. 10, the air flow containing the ions generated by the ion generation unit 135 is sent to the acute angled gap AS, and the medium M is peeled off from the conveyance belt 73 with the pressure of the air flow containing the ions. In this peeling process, the ions in the air flow neutralize residual charge on the conveyance belt 73. Therefore, the medium M peeled off from the conveyance belt 73 is difficult to be adsorbed onto the conveyance belt 73 again. Further, in the peeling operation, the vibration generation unit 125 vibrates the conveyance belt 73. Therefore, the peeling operation using the air flow is promoted with the aid of the vibration.

When the support roller 87 presses the medium M with a predetermined biasing force, the medium M is peeled off from the conveyance belt 73 by the air flow in a region downstream of a pressing position. Further, when an automatic displacement mechanism for the support roller 87 is included, the support roller 87 is at a raised position, and thus, the medium M is peeled off over the entire region up to an upstream end of the conveyance belt 73 by the air flow. The peeling may be performed only on a part (for example, half) of an upper surface of the conveyance belt 73 in the conveyance direction Y.

In step S18, the computer 110 notifies of the jam. Specifically, the computer 110 displays information indicating that the jam has occurred and that the user is prompted to remove the jam, on the display unit 102. The user viewing the content displayed on the display unit 102 opens the cover 15 to perform the jam release work for releasing the jam.

In this case, since the medium M has been peeled off from the conveyance belt 73, the user can relatively easily remove the medium M from the conveyance belt 73. For example, when the peeling operation is not performed, when the user removes the medium M from the conveyance belt 73, the medium M is adsorbed to the conveyance belt 73. Therefore, the user needs to remove the medium M while peeling the medium M off from the conveyance belt 73. In this case, the medium M may be torn. When the medium M is torn, the removal work for removing the medium M from the conveyance belt 73 becomes even more troublesome.

On the other hand, in the first embodiment, before the user performs the medium removal work, the medium M is peeled off from the conveyance belt 73 by the air flow blown by the fan 130 serving as the peeling unit 120. Therefore, the user can remove the medium M not adsorbed to the conveyance belt 73 from the conveyance belt 73 with a relatively weak force. Therefore, the medium M will not be torn at the time of the medium removal work. The user completing the medium removal work closes the cover 15 and then operates the operating unit 101 to notify the recording device 11 that the jam has been removed.

In the next step S19, the computer 110 determines whether a jam removal notification has been received. When the computer 110 receives the jam removal notification, the computer 110 proceeds to step S20, and when the computer 110 has not received the jam removal notification, the computer 110 waits until the computer 110 receives the jam removal notification.

In step S20, the computer 110 performs the jam determination process. This jam determination process is basically the same process as step S13.

In the next step S21, the computer 110 determines whether the jam has been removed. When the jam has been removed, the computer 110 proceeds to step S22. On the other hand, when the jam has not been removed, the computer 110 returns to step S18 and reports the jam. Thus, the computer 110 repeatedly executes each of the processes from step S18 to step S21 until the computer 110 determines in step S21 that the jam has been removed.

In step S22, the computer 110 resumes printing. The computer 110 resumes the printing from a page that has failed due to the jam.

In the next step S23, the computer 110 determines whether the printing has ended. That is, the computer 110 determines whether printing of a designated number of sheets based on the print data PD has ended. When the printing does not end, the process returns to step S11. The resumed printing is performed (step S11).

Similarly, the computer 110 continues the printing in the processes of steps S11 to S23 until a determination is made in step S23 that printing has ended. In step S23, when the computer 110 determines that the printing has ended, the computer 110 ends the routine.

Therefore, according to the first embodiment, the following effects can be obtained.

(1-1) The recording device 11 includes the conveyance belt 73 that adsorbs and conveys the medium M using charge, the recording unit 30 that performs recording on the medium M conveyed by the conveyance belt 73, the determination unit 114 that determines whether or not the jam of the medium M has occurred, and the peeling unit 120 that peels off the medium M from the conveyance belt 73 by blowing air. When there is a medium M staying on the conveyance belt 73 at the time of occurrence of the jam, the peeling unit 120 peels off the medium M from the conveyance belt 73 by blowing air toward the acute angled gap AS in a state in which the acute angled gap AS has been formed between the conveyance belt 73 and the medium M.

According to this configuration, when the medium M is peeled off from the conveyance belt 73, it is possible to reduce concern of damage to the conveyance belt 73. For example, when the medium M is adsorbed to the conveyance belt 73 up to the leading end, there is no peeled portion that is a starting point of peeling when the medium M is peeled from the conveyance belt 73, and thus, for example, it is necessary to forcibly insert a member having a sharp leading end (for example, a claw-like member) between the conveyance belt 73 and the medium M to generate the starting point of peeling, which is a portion in which the medium M is slightly peeled off from the conveyance belt 73. In this case, there is concern that the conveyance belt 73 may be damaged by a sharp leading end portion of the member. On the other hand, in the present configuration, the acute angled gap AS is formed between the portion in which the leading end portion of the medium M is peeled off from the conveyance belt 73 and the conveyance belt 73. The wind (air flow) sent from the peeling unit 120 is guided by the acute angled gap AS, and is introduced into the adsorption interface between the conveyance belt 73 and the medium M. Therefore, it is possible to peel off the medium M from the conveyance belt 73 while curbing damage to the conveyance belt 73.

(1-2) The recording device 11 includes the second detection unit 22 as an example of a detection unit that is located downstream of the conveyance belt 73 and detects the presence or absence of the medium M. When the second detection unit 22 detects the medium M at the time of jam detection, the peeling unit 120 blows air toward the acute angled gap AS formed between the conveyance belt 73 and the medium M. On the other hand, when the second detection unit 22 does not detect the medium M at the time of jam detection, the conveyance belt 73 conveys the medium M to the position at which the second detection unit 22 detects the medium M. The peeling unit 120 blows the air toward the acute angled gap AS formed between the conveyance belt 73 and the medium M. According to this configuration, when the second detection unit 22 does not detect the medium M, the acute angled gap AS is likely not to be formed. In this case, the medium M is conveyed in a direction in which the acute angled gap AS is formed. Therefore, a peeling error of the medium M can be reduced.

(1-3) The recording device 11 includes the ion generation unit 135 that generates ions. The peeling unit 120 blows air containing the ions generated by the ion generation unit 135. According to this configuration, the residual charge on the conveyance belt 73 can be reduced by the ions contained in the wind. Therefore, for example, peeling of the medium M from the conveyance belt 73 can be promoted, or re-adsorption of the peeled medium M onto the conveyance belt 73 can be curbed.

(1-4) The peeling unit 120 changes the amount of blowing air according to the medium size. According to this configuration, the amount of blowing air is adjusted to be suitable for the medium size. Therefore, it is possible to peel off the medium M more reliably from the conveyance belt 73 regardless of the medium size. That is, it is possible to reduce variations in the occurrence of a peeling error depending on the size of the medium M.

Second Embodiment

Next, a second embodiment will be described with reference to FIGS. 13 to 23 and the like. In the second embodiment, a peeling member that is a target that the peeling unit 120 sends toward the acute angled gap AS is a sheet member 141.

Figure 13:
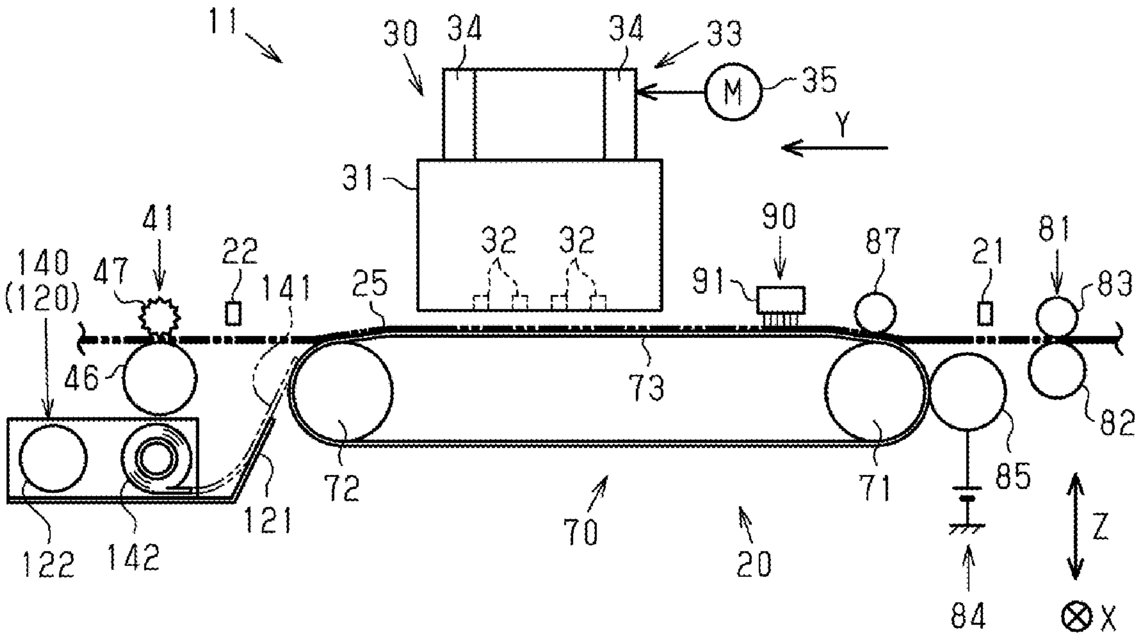
FIG. 13 is a schematic front view illustrating an electrostatic conveyance unit including a peeling unit in a second embodiment.

As illustrated in FIGS. 1, 2, and 13, a basic configuration of the recording device 11 is the same as that in the first embodiment. That is, the recording device 11 includes a conveyance belt 73 that adsorbs and conveys the medium M using charge, and a recording unit 30 that performs recording on the medium M conveyed by the conveyance belt 73.

The recording device 11 includes a first detection unit 21 located upstream of the conveyance belt 73, and a second detection unit 22 located downstream of the conveyance belt 73, as in the first and second embodiments. The first detection unit 21 detects the presence or absence of the medium M at a position upstream of the conveyance belt 73. The second detection unit 22 detects the presence or absence of the medium M at a downstream position of the conveyance belt 73. Also in the third embodiment, the second detection unit 22 on the downstream constitutes an example of the detection unit.

The peeling unit 120 in the second embodiment is a sheet-type peeling unit 140 in which a peeling member that is a target to be sent toward the acute angled gap AS is the sheet member 141. The sheet-type peeling unit 140 peels off the medium M from the conveyance belt 73 using the sheet member 141.

As illustrated in FIG. 13, in the sheet-type peeling unit 140, the sheet member 141 stored in the storage unit 142 is sent along the guide member 121 according to the driving force of the drive unit 122. The second embodiment includes a configuration of the third embodiment in which one sheet-type peeling unit 140 is included (see FIGS. 14 to 18) and a configuration of the fourth embodiment in which a plurality of sheet-type peeling units 140 are included (see FIG. 18). In any of the third and fourth embodiments, a basic configuration of the sheet-type peeling unit 140 is the same.

Third Embodiment

Figure 14:
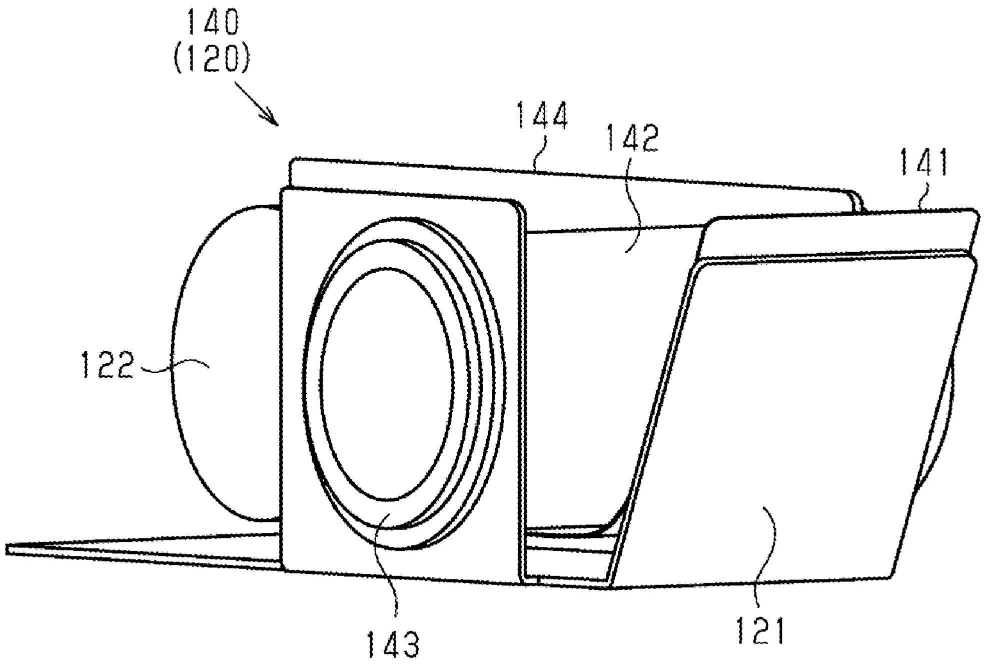
FIG. 14 is a perspective view illustrating a sheet-type peeling unit in a third embodiment.
Figure 15:
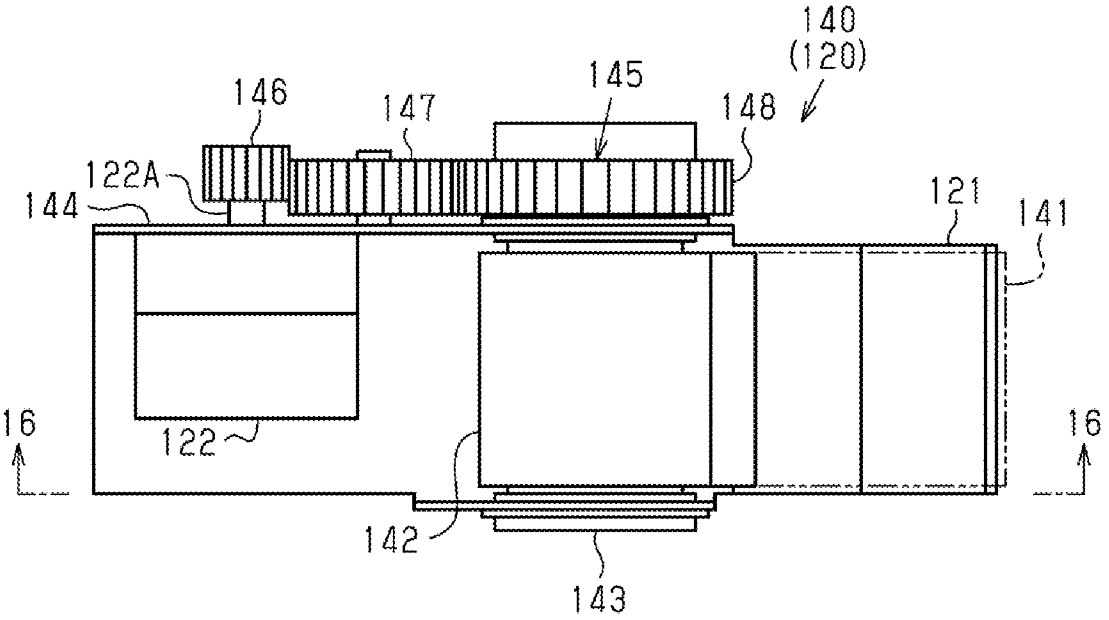
FIG. 15 is a plan view illustrating the sheet-type peeling unit.
Figure 16:
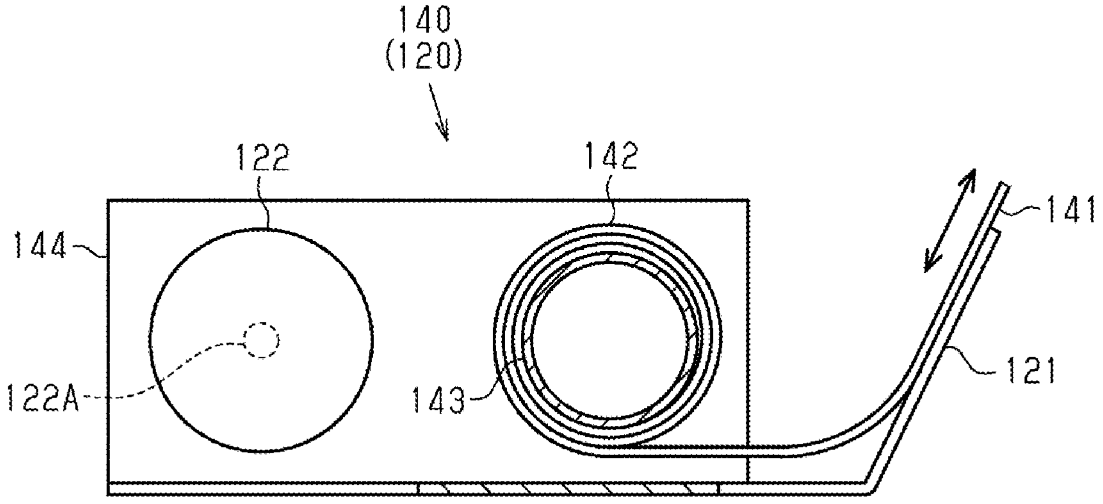
FIG. 16 is a front cross-sectional view illustrating the sheet-type peeling unit taken along line 16-16 in FIG. 15.

First, a detailed configuration of the sheet-type peeling unit 140 of a third embodiment will be described with reference to FIGS. 14 to 16. As illustrated in FIGS. 14 to 16, the sheet-type peeling unit 140 includes a storage unit 142 that winds and stores the sheet member 141, and a drive unit 122 that sends the sheet member 141 stored in the storage unit 142 toward the acute angled gap AS. The storage unit 142 has, for example, a cylindrical core material 143 rotatably supported by a frame 144 having a predetermined shape, and is configured by the sheet member 141 being wound around an outer circumference of the core material 143. Thus, since the sheet member 141 is stored in a state in which the sheet member 141 is wound on the core material 143, a small space is required for disposition of the sheet member 141 with a required length. Here, in order to effectively peel off the medium M, the sheet member 141 may have a length allowing a leading end portion of the sheet member 141 to reach upstream of a center position of the conveyance belt 73 in the conveyance direction Y.

As illustrated in FIG. 15, the drive unit 122 is, for example, an electric motor. The drive unit 122 and the core material 143 are coupled via a gear mechanism 145 so that power can be transmitted. The gear mechanism 145 includes a plurality of gears 146 to 148. Rotation of the gear 146 fixed to a leading end portion of an output shaft 122A of the drive unit 122 is transmitted to the gear 148 via the gear 147, and the core material 143 to which the gear 148 is fixed rotates together with the gear 148. When the drive unit 122 is driven in a forward rotation, the core material 143 rotates normally via the gears 146 to 148. Accordingly, the sheet member 141 is sent from the storage unit 142. On the other hand, when the drive unit 122 is driven in a backward direction, the core material 143 is reversely rotated via the gears 146 to 148, so that the sheet member 141 is wound around the core material 143.

As illustrated in FIG. 16, when the drive unit 122 is driven in the forward rotation, the sheet member 141 is sent toward the acute angled gap AS (see FIG. 19) while being guided by the guide member 121. Meanwhile, when the drive unit 122 is driven in a backward direction, the sheet member 141 is wound around the core material 143 and stored in the storage unit 142. Therefore, when the sheet member 141 is used, the sheet member 141 is sent by a length necessary for peeling, and when the sheet member 141 is not needed, the sheet member 141 is wound and stored compactly in the storage unit 142.

The sheet member 141 may have conductivity. The sheet member 141 itself is made of a conductive material, or at least a surface coming into contact with the conveyance belt 73 is coated with a conductive material, thereby assigning the conductivity to the sheet member 141.

When a jam occurs, the application of the DC voltage from the power supply of the charging unit 84 to the charging roller 85 is stopped. However, the conveyance belt 73 is charged due to the residual charge. The medium M is adsorbed to the conveyance belt 73 due to this residual charge. Even when the medium M is peeled off, the medium M may be re-adsorbed onto the conveyance belt 73 due to residual charge on the conveyance belt 73. In the present embodiment, the sheet member 141 is made conductive, so that the residual charge on the conveyance belt 73 is released through the sheet member 141 and neutralized. A base of the sheet member 141 is grounded within the storage unit 142. The sheet member 141 comes into contact with the conveyance belt 73 in the peeling process, so that the residual charge on the conveyance belt 73 is neutralized. Therefore, re-adsorption of the peeled medium M to the conveyance belt 73 is alleviated. Thus, the sheet-type peeling unit 140 realizes the peeling of the medium M from the conveyance belt 73 using the sheet member 141 and the curbing of re-adsorption of the medium M through neutralization of the residual charge on the conveyance belt 73.

Figure 17:
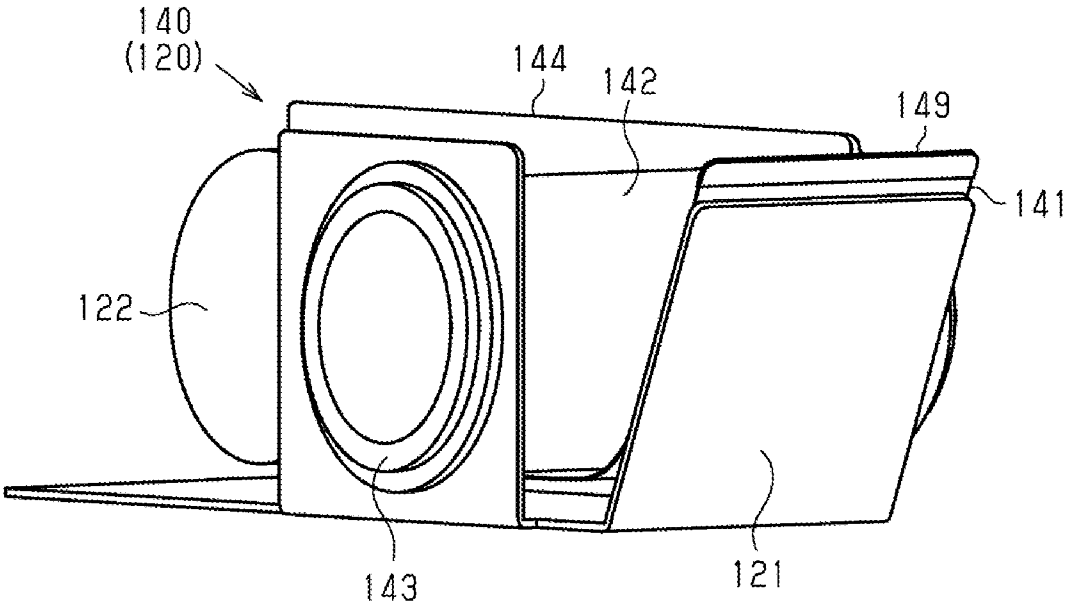
FIG. 17 is a perspective view illustrating a sheet-type peeling unit different from that in FIG. 16.

Further, as illustrated in FIG. 17, a protection member 149 may be provided at a leading end portion of the sheet member 141. The protection member 149 may be fixed to the leading end portion of the sheet member 141 as a separate member, or may be formed by curing a paint applied to the leading end portion of the sheet member 141. According to this configuration, when the leading end portion of the sheet member 141 and the conveyance belt 73 collide, the protection member 149 and the conveyance belt 73 collide. Therefore, damage to the conveyance belt 73 caused by collision between the leading end portion of the sheet member 141 and the conveyance belt 73 can be reduced.

Fourth Example

Figure 18:
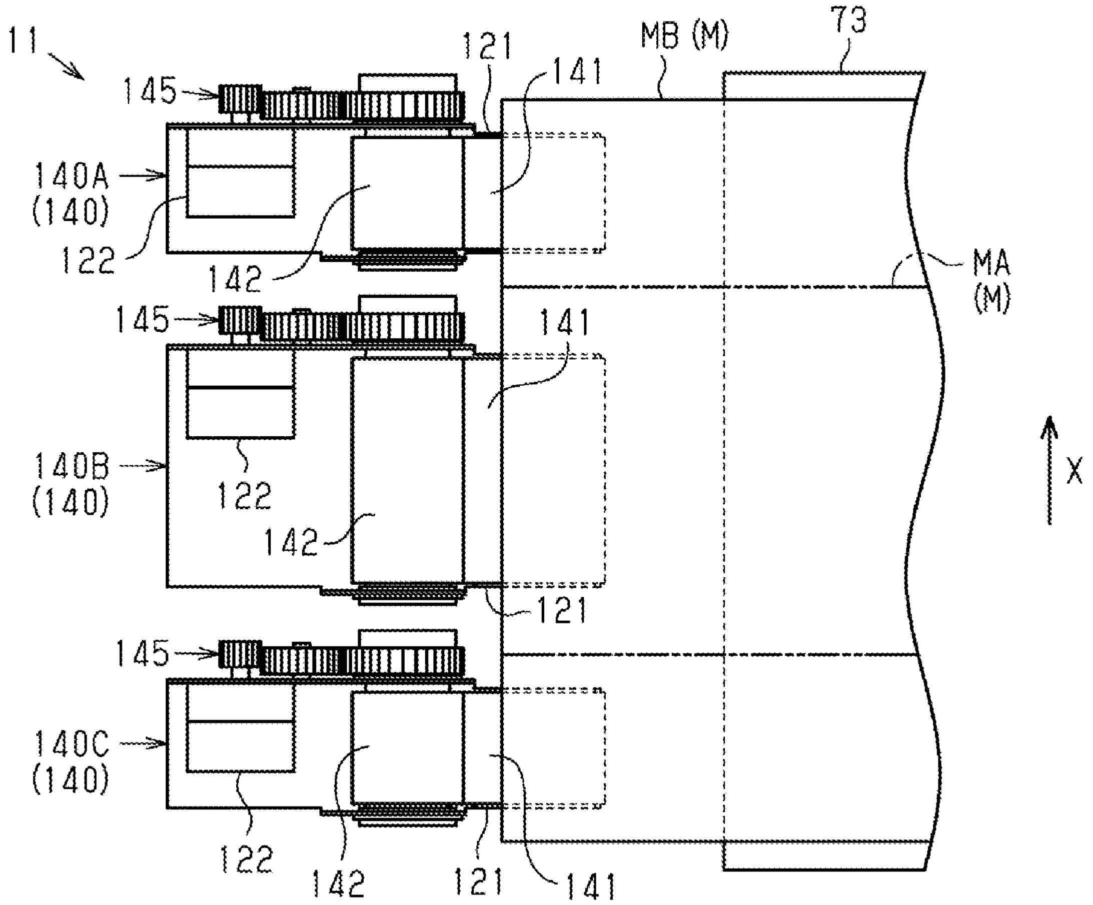
FIG. 18 is a plan view illustrating a state in which a plurality of sheet-type peeling units are disposed in a fourth embodiment.

Next, a detailed configuration of the sheet-type peeling unit 140 of the fourth embodiment will be described with reference to FIG. 18. As illustrated in FIG. 18, a plurality of sheet members 141 may be provided in the width direction X. In the fourth embodiment, a plurality of sheet-type peeling units 140 are disposed in a row in the width direction X. Therefore, the plurality of sheet members 141 are sent from the storage unit 142 and wound on the storage unit 142 individually. The sheet member 141 to be operated may be configured to be selected among the plurality of sheet members 141 according to a medium size.

In the example illustrated in FIG. 18, three sheet-type peeling units 140A to 140C are disposed in a row in the width direction X. The first sheet-type peeling unit 140A and the third sheet-type peeling unit 140C have the same width of the sheet member 141. The second sheet-type peeling unit 140B located at a center between the two peeling units 140A and 140C includes the sheet member 141 with a large width dimension. A width of the sheet member 141 of the second sheet-type peeling unit 140B is larger than those of the two other sheet members 141.

As illustrated in FIG. 18, the medium M is conveyed with a center reference shifted to a center of the width with respect to the conveyance belt 73. When a first medium MA having a small medium size is conveyed, only the second sheet-type peeling unit 140B is driven at the time of detection of the jam. Therefore, when the sheet member 141 is sent from the second sheet-type peeling unit 140B, the first medium MA having a small size is peeled off from the conveyance belt 73. On the other hand, when the second medium MB having a large medium size is conveyed, the first to third sheet-type peeling units 140A to 140C are simultaneously driven at the time of detection of the jam. Therefore, the three sheet members 141 are simultaneously sent from the three sheet-type peeling units 140A to 140C, and the second medium MB having a large size is peeled off from the conveyance belt 73.

Effects of Second Embodiment

Next, an operation of the recording device 11 in the second embodiment will be described. The determination unit 114 (see FIG. 11) of the control unit 100 determines whether the first jam in which the medium M remains on the conveyance belt 73 has occurred. When the determination unit 114 determines that the jam is the first jam in which the medium M stays on the conveyance belt 73, the sheet-type peeling unit 140 sends the sheet member 141 toward the acute angled gap AS in a state in which the acute angled gap AS has been formed between the conveyance belt 73 and the medium M. Specifically, the computer 110 of the control unit 100 executes the program PR of the recording control routine illustrated in FIG. 12 as in the first embodiment, so that recording control including a peeling operation for peeling off the medium M from the conveyance belt 73 at the time of occurrence of the jam is performed.

Figure 19:
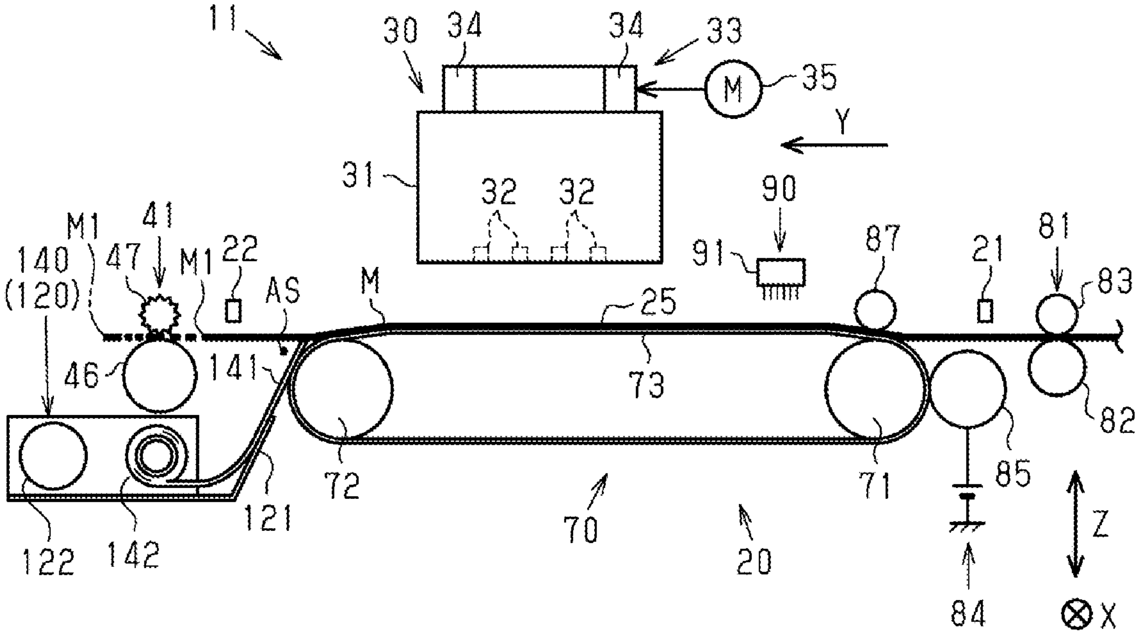
FIG. 19 is a schematic front view illustrating an electrostatic conveyance unit illustrating an operation of the sheet-type peeling unit.

As illustrated in FIG. 19, when the second detection unit 22 detects the medium M at the time of the occurrence of the jam (affirmative determination in step S15), the sheet-type peeling unit 140 inserts the sheet member 141 toward the acute angled gap AS formed between the conveyance belt 73 and the medium M.

When the second detection unit 22 detects the medium M, the detected medium M is located downstream in the conveyance direction Y by a predetermined distance or more from the downstream end of the conveyance belt 73. Therefore, when the second detection unit 22 detects the medium M, the acute angled gap AS is highly likely to be formed. Since the second detection unit 22 detects the medium M, the control unit 100 estimates that the acute angled gap AS is formed.

Figure 20:
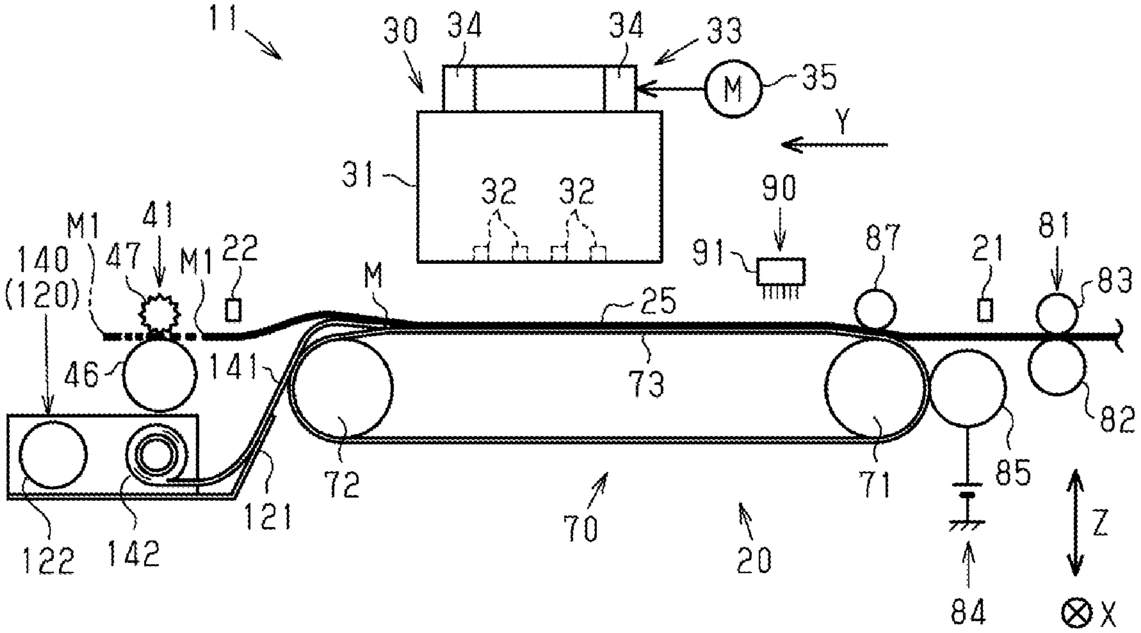
FIG. 20 is a schematic front view of the electrostatic conveyance unit illustrating an operation of the sheet-type peeling unit.
Figure 21:
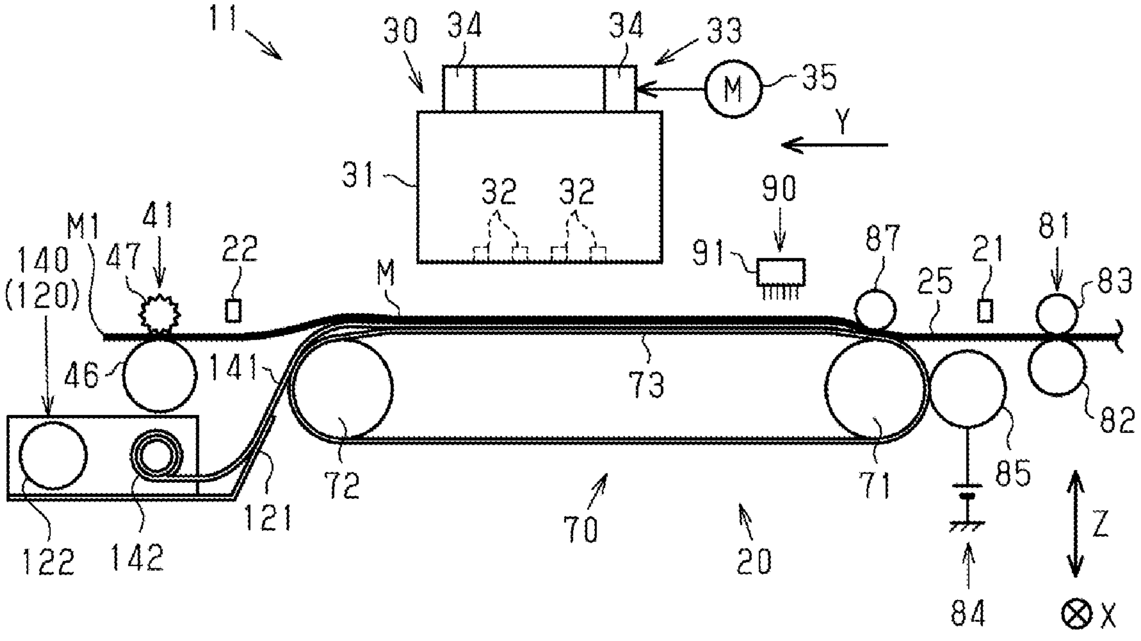
FIG. 21 is a schematic front view of the electrostatic conveyance unit illustrating an operation of the sheet-type peeling unit.

This acute angled gap AS functions as a guide space that can guide the sheet member 141 so that the sheet member 141 can be inserted into the adsorption interface between the conveyance belt 73 and the medium M. The sheet member 141 sent from the storage unit 142 is inserted into the adsorption interface while being guided by the acute angled gap AS formed by the substantially horizontal medium M and the arcuate conveyance belt 73 (FIG. 20). The sheet member 141 is further sent from the sheet-type peeling unit 140, so that the medium M is peeled off to near the upstream end of the conveyance belt 73 in the conveyance direction Y (FIG. 21).

Figure 22:
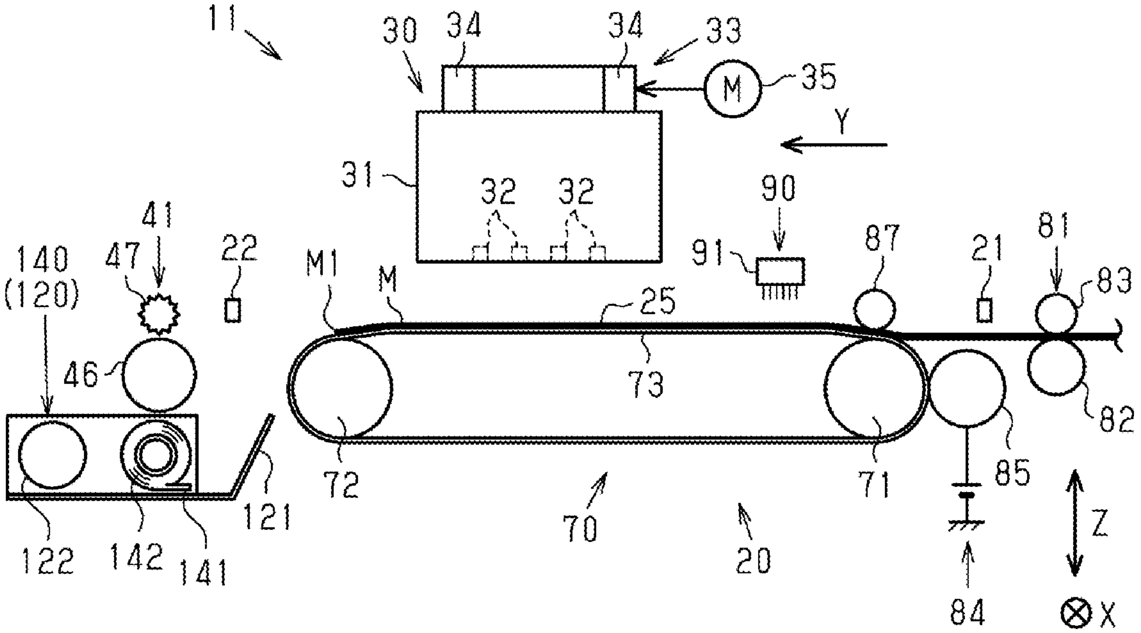
FIG. 22 is a schematic front view of the electrostatic conveyance unit illustrating an operation of the sheet-type peeling unit.

On the other hand, as illustrated in FIG. 22, when the second detection unit 22 does not detect the medium M at the time of occurrence of the jam, the conveyance belt 73 conveys the medium M to the position at which the second detection unit 22 detects the medium M. This conveyance operation may be the first conveyance operation of conveying the medium M to a position detected by the second detection unit 22, or may also be the second conveying operation of conveying the medium M to the position at which the medium M is further nipped by the roller pair 41 after being detected by the second detection unit 22.

Figure 23:
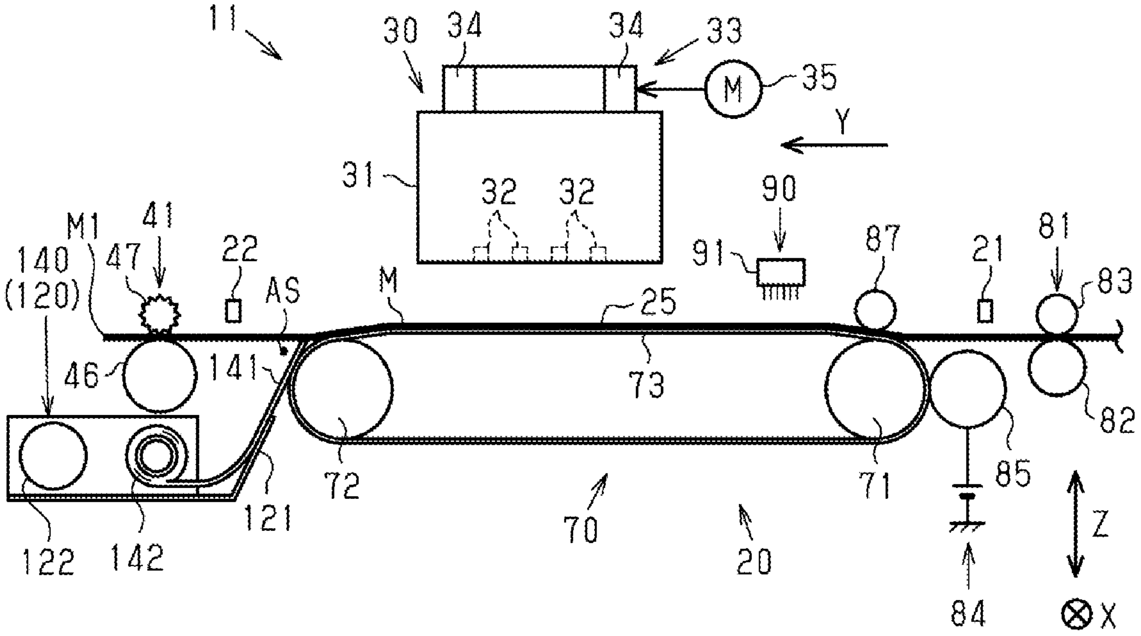
FIG. 23 is a schematic front view of the electrostatic conveyance unit illustrating an operation of the sheet-type peeling unit.

For example, as illustrated in FIG. 23, the medium M is conveyed to the position at which the medium M is nipped by the roller pair 41. Next, the sheet-type peeling unit 140 inserts the sheet member 141 toward the acute angled gap AS formed between the conveyance belt 73 and the medium M. The sheet member 141 sent from the storage unit 142 is guided by the acute angled gap AS formed between the substantially horizontal medium M and the arcuate conveyance belt 73, and is inserted into the adsorption interface (FIG. 20). When the sheet member 141 is further sent from the sheet-type peeling unit 140, so that the medium M is peeled off to near the upstream end of the conveyance belt 73 in the conveyance direction Y (FIG. 21).

Therefore, according to the second embodiment, the following effects can be obtained.

(2-1) The recording device 11 includes the conveyance belt 73 that adsorbs and conveys the medium M using charge, the recording unit 30 that performs recording on the medium M conveyed by the conveyance belt 73, and the determination unit 114 that determines whether or not the jam of the medium M has occurred. Further, the recording device 11 includes a peeling unit 120 that peels off the medium M from the conveyance belt 73 using the sheet member 141 as an example of a peeling member. When there is the medium M staying on the conveyance belt 73 when the jam occurs, the peeling unit 120 inserts the sheet member 141 toward the acute angled gap AS in a state in which the acute angled gap AS has been formed between the conveyance belt 73 and the medium M, and the medium M is peeled off from the conveyance belt 73. According to this configuration, when the medium M is peeled off from the conveyance belt 73, it is possible to reduce concern of damage to the conveyance belt 73. For example, when the medium M is adsorbed to the conveyance belt 73 up to the leading end, there is no peeled portion that becomes the starting point of peeling when the medium M is peeled from the conveyance belt 73, and thus, for example, it is necessary to forcibly insert a member having a sharp leading end (for example, a claw-like member) between the conveyance belt 73 and the medium M to generate the starting point of peeling, which is a portion in which the medium M is slightly peeled off from the conveyance belt 73. In this case, there is concern that a leading end portion of the sharp member may damage the conveyance belt 73. On the other hand, in the present configuration, the acute angled gap AS is formed between the portion in which the leading end portion of the medium M is peeled off from the conveyance belt 73 and the conveyance belt 73. The sheet member 141 sent from the peeling unit 120 is guided by the conveyance belt 73 and the medium M which form the acute angled gap AS, and is inserted into the adsorption interface between the conveyance belt 73 and the medium M. Accordingly, the material of the peeling unit 120 can be inserted into the adsorption interface between the conveyance belt 73 and the medium M even when the leading end portion of the sheet member 141 is not sharpened. Therefore, it is possible to peel off the medium M from the conveyance belt 73 while curbing damage to the conveyance belt 73.

(2-2) The recording device 11 includes the second detection unit 22 as an example of a detection unit that is located downstream of the conveyance belt 73 and detects the presence or absence of the medium M. When the second detection unit 22 detects the medium M at the time of the occurrence of the jam, the peeling unit 120 inserts the sheet member 141 which is an example of the peeling member toward the acute angled gap AS formed between the conveyance belt 73 and the medium M. On the other hand, when the second detection unit 22 does not detect the medium M at the time of occurrence of the jam, the conveyance belt 73 conveys the medium M to the position at which the second detection unit 22 detects the medium M. The peeling unit 120 inserts the sheet member 141 toward the acute angled gap AS formed between the conveyance belt 73 and the medium M. According to this configuration, when the second detection unit 22 does not detect the medium M at the time of occurrence of the jam, there is a likelihood that the acute angled gap AS is not formed. In this case, the medium M is conveyed in a direction in which the acute angled gap AS is formed. Therefore, a peeling error of the medium M can be reduced.

(2-3) In the recording device 11, the sheet member 141 which is an example of the peeling member has conductivity. According to this configuration, the material of the peeling unit 120 having conductivity comes into contact with the conveyance belt 73, so that the residual charge on the conveyance belt 73 can be reduced.

(2-4) The storage unit 142 that winds and stores the sheet member 141 which is an example of the peeling member, and the drive unit 122 that sends the sheet member 141 stored in the storage unit 142 toward the acute angled gap AS are included. According to this configuration, since the sheet member 141 is stored in a wound state, a space in which the sheet member 141 is disposed can be reduced. For example, this contributes to downsizing of the recording device 11.

(2-5) The protection member 149 is provided at the leading end portion of the sheet member 141. According to this configuration, damage to the conveyance belt 73 caused by the leading end portion of the sheet member 141 colliding with the conveyance belt 73 can be reduced.

Third Embodiment

Next, a third embodiment will be described with reference to FIGS. 24, 25, and the like. In the third embodiment, a target that the peeling unit 120 sends toward the acute angled gap AS is a wire 151.

Figure 24:
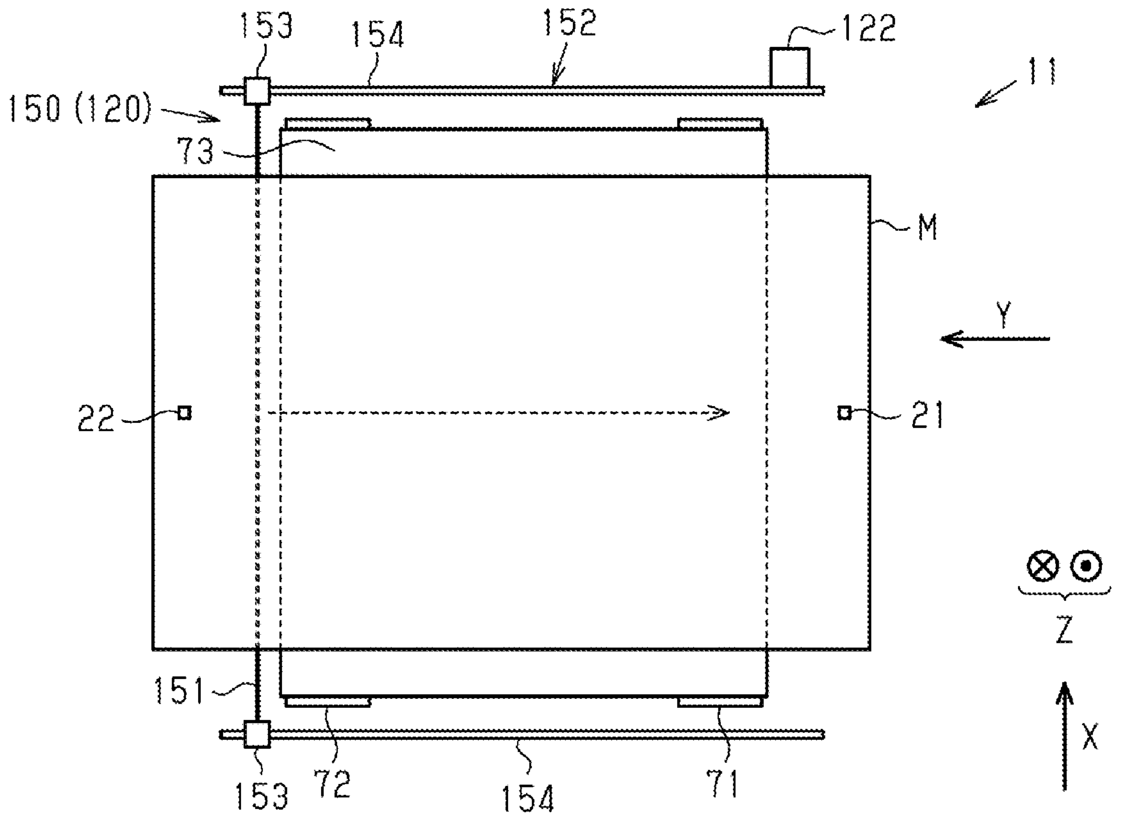
FIG. 24 is a schematic plan view illustrating an electrostatic conveyance unit including a wire-type peeling unit in a third embodiment.
Figure 25:
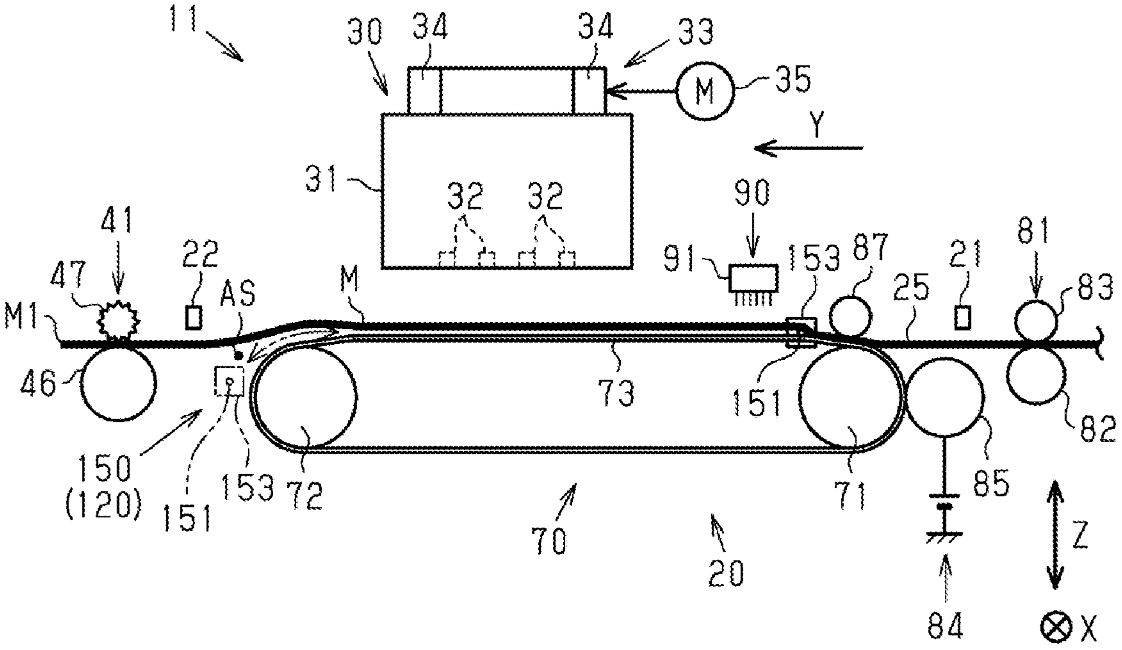
FIG. 25 is a schematic front view illustrating the operation of the wire-type peeling unit.

As illustrated in FIG. 24, the recording device 11 includes the conveyance belt 73 that adsorbs and conveys the medium M using charge, the recording unit 30 that performs recording on the medium M conveyed by the conveyance belt 73, and the determination unit 114 (see FIG. 11) that determines whether or not the jam of the medium M has occurred. Further, the recording device 11 includes a second detection unit 22 which is located downstream of the conveyance belt 73 and detects the presence or absence of the medium M, as an example of the detection unit. The recording device 11 of the present embodiment includes a wire-type peeling unit 150 as an example of the peeling unit 120 that peels off the medium M from the conveyance belt 73 using the wire 151 as an example of a peeling member.

Next, a configuration of the wire-type peeling unit 150 as the peeling unit 120 will be described with reference to FIGS. 24 and 25. As illustrated in FIG. 24, the wire-type peeling unit 150 includes the wire 151 as an example of the peeling member. The wire 151 is configured to be movable in the conveyance direction Y in a state in which the wire 151 is stretched in the width direction X. In the example illustrated in FIG. 24, the driving force of the drive unit 122 that drives the wire 151 is transmitted to the wire 151 via the power transmission mechanism 152. The power transmission mechanism 152 includes a pair of movable portions 153 that support both end portions of the wire 151, and a guide portion 154 that guides the pair of movable portions 153. The pair of movable portions 153 are disposed at positions outside both side ends of the conveyance belt 73 in the width direction X. Both end portions of the wire 151 are supported by the pair of movable portions 153. The wire 151 is stretched to extend parallel to the conveyance belt 73 and in the width direction X. The guide portion 154 guides the pair of movable portions 153 so that the movable portions 153 move along both side ends of the conveyance belt 73. The guide portion 154 may include at least one of a rail and a belt.

When there is the medium M staying on the conveyance belt 73 at the time of occurrence of the jam, the wire-type peeling unit 150 sends the wire 151 toward the acute angled gap AS in the state in which the acute angled gap AS has been formed between the conveyance belt 73 and the medium M. The insertion allows the medium M to be peeled off from the conveyance belt 73. In this case, the wire 151 is moved in a direction upstream of the conveyance direction Y indicated by a dashed arrow in FIG. 24 from a standby position indicated by a solid line in FIG. 24 and a two-dot chain line in FIG. 25, thereby peeling off the medium M from the conveyance belt 73 as illustrated in FIG. 25.

Specifically, the control unit 100 performs the following control based on a determination result of the determination unit 114. When the second detection unit 22 detects the medium M at the time of occurrence of the jam, the wire-type peeling unit 150 inserts the wire 151 toward the acute angled gap AS formed between the conveyance belt 73 and the medium M. On the other hand, when the second detection unit 22 does not detect the medium M at the time of occurrence of the jam, the conveyance belt 73 conveys the medium M to the position at which the second detection unit 22 detects the medium M. The peeling unit 120 inserts the wire 151 toward the acute angled gap AS formed between the conveyance belt 73 and the medium M.

Therefore, according to the third embodiment, the following effects can be obtained.

(3-1) An example of the peeling member is the wire 151. The recording device 11 includes a pair of movable portions 153 and a drive unit 122. The pair of movable portions 153 support the wire 151 in a state in which the wire 151 is stretched parallel to the conveyance belt 73 in the width direction X at a position on the outer side relative to both side ends of the conveyance belt 73 in the width direction X.

The drive unit 122 moves the pair of movable portions 153 along the side ends of the conveyance belt 73 to send the wire 151 toward the acute angled gap AS. According to this configuration, it is possible to peel off the medium M from the conveyance belt 73 using the wire 151. Since the wire 151 can be inserted over the entire region in the width direction X with respect to the adsorption interface between the medium M and the conveyance belt 73, the medium M can be peeled off more reliably from the conveyance belt 73, as compared to a configuration in which a peeling member inserted only in a part in the width direction X of the adsorption interface is used.

Fourth embodiment

Next, a fourth embodiment will be described with reference to FIG. 26. A recording device 11 of the fourth embodiment includes a conveyance belt 73, a recording unit 30, a roller pair 41, and a determination unit 114, as in each of the embodiments described above. Specifically, the conveyance belt 73 adsorbs and conveys the medium M using charge. The recording unit 30 performs recording on the medium M conveyed by the conveyance belt 73. Further, the recording device 11 includes a moving mechanism 160 that sets one end of the conveyance belt 73 as a fixed end (for example, the first belt roller 71 side), and moves a free end (for example, the second belt roller 72 side) that is the other end of the conveyance belt 73 downward. The roller pair 41 is provided on the downstream in the conveyance direction Y of the medium M relative to the free end of the conveyance belt 73, and is configured to be able to nip the medium M. The roller pair 41 rotates the medium M in a state in which roller pair 41 nips the medium M to convey the medium M downstream in the conveyance direction Y. The determination unit 114 is included in the control unit 100 and determines whether or not the jam of the medium M has occurred.

Figure 26:
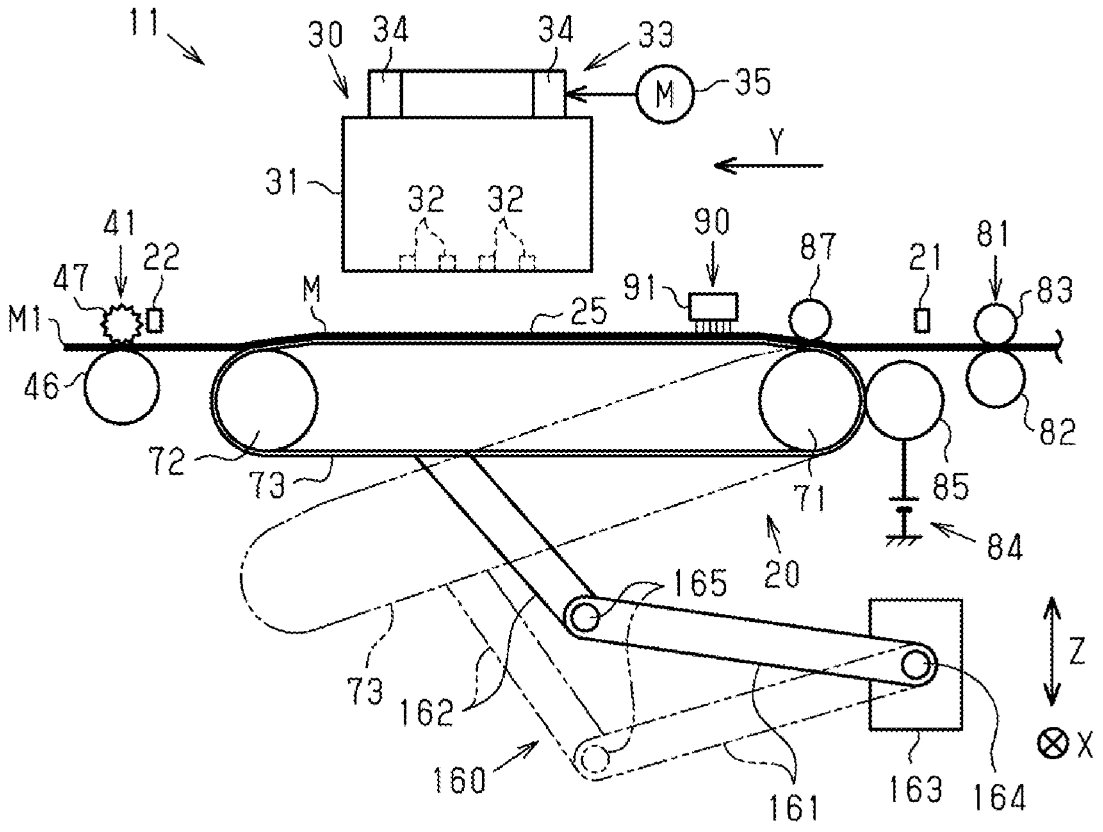
FIG. 26 is a schematic front view illustrating a peeling operation of retracting the conveyance belt in a fourth embodiment.

In the example illustrated in FIG. 26, the moving mechanism 160 lowers (retracts) the conveyance belt 73 in a direction away from the recording head 31. The recording device 11 of the present embodiment includes a maintenance device (not illustrated) for performing maintenance including cleaning of the recording head 31. The maintenance device includes a cap member configured to be able to come into contact with the nozzle surface 31A to form a closed space communicating with the nozzle 32 of the recording head 31 at the time of maintenance. The maintenance device is included to be able to move the cap member to a retracted position which does not interfere with the conveyance belt 73 indicated by a solid line in FIG. 26 and a capping position which comes into contact with the nozzle surface 31A of the recording head 31 in a state in which the conveyance belt 73 is retreated to a descending position indicated by a two-dot chain line in FIG. 26. Therefore, the moving mechanism 160 is configured to be able to rotate the conveyance belt 73 between a conveyance position shown by a solid line in FIG. 26 and a retracted position shown by a two-dot chain line in FIG. 26.

The moving mechanism 160 includes a link mechanism including a first arm 161 and a second arm 162, and a drive source 163. A base end portion of the first arm 161 is fixed to an output shaft 164 of the drive source 163. A leading end portion of the first arm 161 is rotatably coupled to a base end portion of the second arm 162 via a rotation shaft 165. A leading end portion of the second arm 162 is rotatably coupled to the conveyance belt 73 via a rotation shaft (not illustrated). The drive source 163 is configured of, for example, an electric motor. The control unit 100 (see FIG. 1) controls the conveyance belt 73, the recording head 31 and elevating mechanism 33 constituting the recording unit 30, the conveyance unit 20, and the drive source 163.

The control unit 100 performs the following control when the jam has occurred, in which the determination unit 114 determines that a jam (first jam) of the medium M has occurred. When the roller pair 41 is in the state illustrated in FIG. 26 in which the roller pair 41 nips the medium M, the moving mechanism 160 rotates the conveyance belt 73 counterclockwise in FIG. 26 around the fixed end (for example, a rotation axis of the first belt roller 71), thereby moving the free end of the conveyance belt 73 downward. On the other hand, when the roller pair 41 is not nipping the medium M, the conveyance belt 73 conveys the medium M to a position at which the roller pair 41 can nip the medium M. In a state indicated by a solid line in FIG. 26 in which the roller pair 41 is nipping the medium M, the moving mechanism 160 turns the conveyance belt 73 counterclockwise around the fixed end to the position indicated by a two-dot chain line in FIG. 26, thereby moving the free end of the conveyance belt 73 downward.

In a state in which the medium M is nipped by the roller pair 41 at a position downstream of the free end of the conveyance belt 73, the free end of the conveyance belt 73 moves downward. Accordingly, an angle between a tension direction of the medium M and the adsorption surface of the conveyance belt 73 becomes larger, and a nip position of the medium M and an adsorption position on the conveyance belt 73 are spaced apart, so that the tension acting on the medium M is increased. Therefore, according to the fourth embodiment, it is also possible to peel off the medium M from the conveyance belt 73 while curbing damage to the conveyance belt 73.

The above embodiments can also be modified into forms such as the following modification examples. Further, a further modification example may be made by appropriately combining the above embodiments and modification examples to be shown hereinafter, or a further modification example may be made by appropriately combining the modification examples to be shown hereinafter.

In the first to sixth embodiments, the detection unit may be the first detection unit 21 that is located upstream of the conveyance belt 73 and detects the presence or absence of the medium M. In this case, the peeling units 120 (130 or 140) and 150 are disposed on the upstream of the conveyance belt 73 in the conveyance direction Y. When the first detection unit 21 detects the medium M at the time of occurrence of the jam, the peeling units 120 and 150 blow the air or sends the peeling member (sheet member 141 or wire 151) toward the acute angled gap AS formed between the conveyance belt 73 and the medium M on the upstream of the conveyance belt 73 in the conveyance direction Y. Further, when the first detection unit 21 does not detect the medium M at the time of occurrence of the jam, the conveyance belt 73 conveys the medium M upstream in the conveyance direction Y until the first detection unit 21 detects the medium M. Thereafter, the peeling unit 120 blows air or sends the peeling member toward the acute angled gap AS formed between the conveyance belt 73 and the medium M. The medium M forming the acute angled gap AS may be nipped by the supply roller pair 81 disposed at a further upstream position relative to the upstream end of the conveyance belt 73 in the conveyance direction Y.

A driving speed in the peeling operation may be changed depending on the medium size. In this case, a peeling operation may be performed first at a first peeling speed, and then a second peeling operation may be performed at a slower or faster speed than the first peeling speed. Alternatively, the peeling operation may be started at the first peeling speed, and then the peeling speed may be changed stepwise or continuously from the first peeling speed to the second peeling speed. For example, the sheet member 141 may be sent at high speed until the sheet member 141 reaches the adsorption interface, and the sheet member 141 may be sent at low speed in a process of inserting the sheet member 141 into the adsorption interface and peeling off the medium M from the conveyance belt 73. The driving speed refers to a rotational speed of the fan 130 in the first embodiment, a feeding speed of the sheet member 141 in the second embodiment, and a moving speed of the wire 151 in the third embodiment.

The driving speed in the peeling operation may be changed depending on the medium size. For example, the control unit 100 determines whether the medium size is smaller than a size threshold value. When the medium size is smaller than the size threshold value, the drive unit 122 of the peeling unit 120 is driven at a first drive speed, and when the medium size is equal to or larger than the size threshold value, the drive unit 122 of the peeling unit 120 is driven at a second drive speed higher than the first drive speed. Here, the peeling unit 120 is the fan 130 in the first embodiment. In the second embodiment, the peeling unit 120 is the sheet-type peeling unit 140. In the first embodiment in which the peeling unit 120 is the fan 130, the rotation speed of the fan 130 may be changed depending on the medium size. In the second embodiment in which the peeling unit 120 is the sheet type peeling unit 140, the feeding speed of the sheet member 141 may be changed depending on the medium size. Here, the size threshold value is not limited to one, but a plurality of size threshold value may be set gradually. The size threshold value may be set, for example, between an A4 size and an A3 size. The size threshold value may be a constant value, or may be set to be selected according to an estimated adsorption area of the medium M that is adsorbed to the conveyance belt 73 when the first jam occurs.

In the first embodiment, the drive time of the fan 130 may be changed depending on the medium size. For example, the control unit 100 may drive the drive unit 122 of the peeling unit 120 for a first drive time when the medium size is smaller than the size threshold value, and may drive the drive unit 122 of the peeling unit 120 for a second drive time longer than the first drive time when the medium size is larger than or equal to the size threshold value.

In each of the above embodiments, the medium M may be peeled off from the conveyance belt 73 in the first direction from upstream to downstream in the conveyance direction Y. In the case of this configuration, the first detection unit 21 corresponds to an example of a detection unit. In this case, the cover 15 that is opened and closed when the jam release work is performed may be provided on the upstream of the conveyance belt 73 in the conveyance direction Y.

In the configuration in which there is no protection member 149 in the second embodiment, a processed portion obtained by performing a rounding process on the leading end portion of the sheet member 141 may be formed. The processed portion may be subjected to a rounding process through molding or, for example, the leading end portion of the sheet member 141 made of a thermoplastic resin may be rounded by subjecting the leading end portion of the sheet member 141 to heat treatment for heat melting.

In the second to sixth embodiments, the conveyance belt 73 may be vibrated by the vibration generation unit 125 so that a peeling operation for peeling off the medium M from the conveyance belt 73 is assisted.

The medium M may be peeled off from the conveyance belt 73 by only generating vibration of the conveyance belt 73.

As the peeling unit 120, both the fan 130 and the sheet type peeling unit 140 may be adopted.

The peeling member may be a rod member instead of the sheet member 141 or the wire 151. The wire 151 needs both ends that supports both end portions so that tension is assigned, but since the rod member has rigidity, the rod member may be supported either on one side or on both ends. For example, a configuration in which two rods are supported on one side from both sides of the conveyance belt 73 in the width direction X may be adopted. Further, one rod member may be supported on one side or on both sides. The rod member may be configured to be able to be disposed in a region extending over half or more of a belt width in the width direction X of the conveyance belt 73.

The conveyance belt 73 is not limited to a configuration in which the medium M is adsorbed using the electrostatic adsorption force. For example, the conveyance belt 73 may have an adhesive layer on a surface.

The medium M is not limited to paper or the like, but may also be fabric such as cloth or nonwoven fabric, board paper, a synthetic resin film, a laminate medium, or the like.

The recording device 11 is not limited to an inkjet printing device (printer) that prints on paper, but may also be a textile printing device. Further, the recording device 11 may be a laser printer, a dot impact printer, a thermal printing type printer, or the like.

Hereinafter, technical ideas ascertained from the embodiments and modification examples will be described together with effects.

(A) A recording device includes a conveyance belt configured to adsorb and convey a medium using charge; a recording unit configured to perform recording on the medium conveyed by the conveyance belt; a determination unit configured to determine whether or not a jam of the medium has occurred; and a peeling unit configured to peel off the medium from the conveyance belt by blowing air, wherein, when there is a medium staying on the conveyance belt at the time of occurrence of the jam, the peeling unit peels off the medium from the conveyance belt by blowing air toward an acute angled gap in a state in which the acute angled gap is formed between the conveyance belt and the medium.

According to this configuration, it is possible to reduce concern that the conveyance belt will be damaged when the medium is peeled off from the conveyance belt. For example, when the medium is adsorbed to the conveyance belt up to the leading end, there is no peeled portion that is the starting point of peeling when the medium is peeled off from the conveyance belt, and thus, it is necessary for the sharp member (for example, the claw-like member) to be forcibly inserted between the conveyance belt and the medium to generate the starting point of peeling, which is a portion in which the medium is slightly peeled off from the conveyance belt. In this case, there is concern that the conveyance belt may be damaged by the leading end portion of the sharp member. On the other hand, in the present configuration, an acute angled gap is formed between the portion in which the leading end portion of the medium is peeled off from the conveyance belt and the conveyance belt. The wind (air flow) sent from the peeling unit is guided by the acute angled gap and introduced into the interface on which the medium is adsorbed to the conveyance belt. Therefore, it is possible to peel off the medium from the conveyance belt while curbing damage to the conveyance belt.

(B) The recording device according to (A) above, including: a detection unit located upstream or downstream of the conveyance belt and configured to detect the presence or absence of the medium; wherein, when there is a medium staying on the conveyance belt at the time of occurrence of the jam and the detection unit detects the medium, the peeling unit may blow air toward the acute angled gap formed between the conveyance belt and the medium, and when there is the medium staying on the conveyance belt at the time of occurrence of the jam and the detection unit does not detect the medium, the conveyance belt may convey the medium to a position at which the medium is detected by the detection unit, and the peeling unit may blow air toward the acute angled gap formed between the conveyance belt and the medium.

According to this configuration, when the detection unit does not detect the medium, there is a likelihood that the acute angled gap is not formed. In this case, the medium is conveyed in a direction in which the acute angled gap is formed. Therefore, it is possible to reduce a peeling error of the medium.

(C) The recording device according to (A) or (B) above may include an ion generation unit configured to generate ions, wherein the peeling unit may blow air containing the ions generated by the ion generation unit.

According to this configuration, the residual charges on the conveyance belt can be reduced by the ions contained in the wind. Therefore, for example, peeling of the medium from the conveyance belt can be promoted, or re-adsorption of the peeled medium onto the conveyance belt can be curbed.

(D) In the recording device according to any one of (A) to (C) above, the peeling unit may change the amount of blowing air depending on the size of the medium.

According to this configuration, the amount of blowing air is adjusted to be suitable for the medium size. Therefore, it is possible to peel off the medium more reliably from the conveyance belt regardless of the medium size. That is, the occurrence of a peeling error due to the medium size can be reduced.

(E) A recording device including: a conveyance belt configured to adsorb and convey a medium using charge; a recording unit configured to perform recording on the medium conveyed by the conveyance belt; a determination unit configured to determine whether or not a jam of the medium has occurred; and a peeling unit configured to peel off the medium from the conveyance belt using a peeling member, wherein, when there is a medium staying on the conveyance belt at the time of occurrence of the jam, the peeling unit peels off the medium from the conveyance belt by inserting the peeling member into an acute angled gap in a state in which the acute angled gap is formed between the conveyance belt and the medium.

According to this configuration, it is possible to reduce concern that the conveyance belt will be damaged when the medium is peeled off from the conveyance belt. For example, when the medium is adsorbed to the conveyance belt up to the leading end, there is no peeled portion that is the starting point of peeling when the medium is peeled off from the conveyance belt, and thus, it is necessary for the sharp member (for example, the claw-like member) to be forcibly inserted between the conveyance belt and the medium to generate the starting point of peeling, which is a portion in which the medium is slightly peeled off from the conveyance belt. In this case, there is concern that the leading end portion of the sharp member may damage the conveyance belt. On the other hand, in the present configuration, an acute angled gap is formed between the portion in which the leading end portion of the medium is peeled off from the conveyance belt and the conveyance belt. The peeling member sent from the peeling unit is guided to the conveyance belt and the medium forming the acute angled gap, and is inserted into the adsorption interface between the conveyance belt and the medium. Accordingly, the peeling member can be inserted into the adsorption interface between the conveyance belt and the medium even when the leading end portion of the peeling member is not sharp. Therefore, it is possible to peel off the medium M from the conveyance belt while suppressing damage to the conveyance belt.

(F) The recording device according to (E) above may include: a detection unit located upstream or downstream of the conveyance belt and configured to detect the presence or absence of the medium; wherein, when there is a medium staying on the conveyance belt at the time of occurrence of the jam and the detection unit detects the medium, the peeling unit may insert the peeling member into the acute angled gap formed between the conveyance belt and the medium, and when there is the medium staying on the conveyance belt at the time of occurrence of the jam and the detection unit does not detect the medium, the conveyance belt may convey the medium to a position at which the medium is detected by the detection unit, and the peeling unit may insert the peeling member into the acute angled gap formed between the conveyance belt and the medium.

According to this configuration, when the detection unit does not detect the medium at the time of the occurrence of the jam, there is a likelihood that the acute angled gap is not formed. In this case, the medium is conveyed in a direction in which the acute angled gap is formed. Therefore, it is possible to reduce a peeling error of the medium.

(G) In the recording device according to (E) or (F) above, wherein the peeling member may have conductivity.

According to this configuration, the peeling member having the conductivity comes into contact with the conveyance belt, so that the residual charge on the conveyance belt can be reduced.

(H) The recording device according to any one of (E) to (G) above, wherein the peeling member may be the sheet member, and may include a storage unit configured to wind and store the sheet member; and a drive unit configured to send the sheet member stored in the storage unit toward the acute angled gap.

According to this configuration, since the sheet member is stored in a rolled state, it is possible to reduce a space in which the sheet member is disposed. For example, this contributes to downsizing of the recording device.

(I) The recording device according to any one of (E) to (H) above, wherein the peeling member may be the sheet member, and a protection member may be provided at the leading end portion of the sheet member.

According to this configuration, it is possible to reduce damage to the conveyance belt caused by the leading end portion of the sheet member colliding with the conveyance belt.

(J) The recording device according to any one of (E) to (I) above, wherein the peeling member may be the sheet member, and a plurality of the sheet members may be provided in a width direction intersecting with a conveyance direction in which the medium is conveyed, and the recording device may be configured to select the sheet member to operate from among the plurality of sheet members according to a medium size.

According to this configuration, it is possible to send an appropriate number of sheet members selected according to the medium size toward the acute angled gap. Therefore, it is possible to peel off the medium more reliably from the conveyance belt regardless of the medium size. For example, it is possible to reduce an increase in a frequency of occurrence of a peeling error as the medium size increases, which is easy to occur when the peeling operation is performed using the same number (for example, one) of sheet members.

(K) The recording device according to any one of (E) to (G) above, wherein the peeling member may be the wire, and the recording device may include a pair of movable portions configured to support the wire in a state in which the wire is stretched parallel to the conveyance belt and in a width direction intersecting with a conveyance direction in which the medium is conveyed, at a position on the outer side relative to both side ends of the conveyance belt in the width direction; and a drive unit configured to send the wire toward the acute angled gap by moving the pair of movable portions along the side ends of the conveyance belt.

According to this configuration, it is possible to peel off the medium from the conveyance belt using the wire. Since the wire can be inserted over the entire region in a width direction of the adsorption interface between the medium and the conveyance belt, it is possible to peel off the medium more reliably from the conveyance belt, as compared to a configuration in which the peeling member inserted only into a part in the width direction of the adsorption interface is used.

(L) A recording device includes: a conveyance belt configured to adsorb and convey a medium using charge; a recording unit configured to perform recording on the medium conveyed by the conveyance belt; a determination unit configured to determine whether or not a jam of the medium has occurred; a moving mechanism configured to set one end portion of the conveyance belt as a fixed end, and move a free end that is the other end of the conveyance belt downward; and a roller pair provided downstream of the free end of the conveyance belt in a conveyance direction of the medium and configured to nip the medium; wherein, when the roller pair is nipping the medium at the time of occurrence of the jam, the moving mechanism moves the conveyance belt downward, and when the roller pair is not nipping the medium, the conveyance belt conveys the medium to a position at which the roller pair is able to nip, and the moving mechanism moves the free end of the conveyance belt downward.

According to this configuration, it is possible to reduce concern that the conveyance belt will be damaged when the medium is peeled off from the conveyance belt. For example, when the medium is adsorbed to the conveyance belt up to the leading end, there is no peeled portion that is the starting point of peeling when the medium is peeled off from the conveyance belt, and thus, it is necessary for a member having a sharp leading end to be forcibly inserted between the conveyance belt and the medium to generate the starting point of peeling, which is a portion in which the medium is slightly peeled off from the conveyance belt. In this case, there is concern that the leading end portion of the sharp member may damage the conveyance belt. On the other hand, in this configuration, in a state in which the medium is nipped by the roller pair at a position downstream of the free end of the conveyance belt, the free end of the conveyance belt moves downward. As a result, an angle between a direction of the tension of the medium and the adsorption surface of the conveyance belt increases, and a nip position of the medium and an adsorption position on the conveyance belt are spaced apart so that the tension acting on the medium M increases. Therefore, it is possible to peel off the medium from the conveyance belt while curbing damage to the conveyance belt.

What is claimed is:

1. A recording device comprising:

a conveyance belt configured to adsorb and convey a medium using charge;

a recording unit configured to perform recording on the medium conveyed by the conveyance belt;

a determination unit configured to determine whether or not the medium is jammed; and a peeling unit configured to peel off the medium from the conveyance belt by blowing air, wherein, when the medium stays on the conveyance belt at the time of occurrence of the jam, the peeling unit peels off the medium from the conveyance belt by blowing air, in a state in which an acute angled gap is formed between the conveyance belt and the medium, toward the acute angled gap.

2. The recording device according to claim 1, comprising:

a detection unit located upstream or downstream of the conveyance belt and configured to detect the presence or absence of the medium;

wherein, when the medium stays on the conveyance belt at the time of occurrence of the jam and the detection unit detects the medium, the peeling unit blows air toward the acute angled gap formed between the conveyance belt and the medium, and when the medium stays on the conveyance belt at the time of occurrence of the jam and the detection unit does not detect the medium, the conveyance belt conveys the medium to a position at which the medium is detected by the detection unit, and the peeling unit blows air toward the acute angled gap formed between the conveyance belt and the medium.

3. The recording device according to claim 2, wherein the detection unit is located downstream of the conveyance belt, and the peeling unit is located downstream of the conveyance belt.

4. The recording device according to claim 1, comprising:

an ion generation unit configured to generate ions, wherein the peeling unit blows air containing the ions generated by the ion generation unit.

5. The recording device according to claim 1, wherein the peeling unit changes an amount of blowing air according to a size of the medium.

* * * * *